US012132505B2

(12) United States Patent
Kwun

(10) Patent No.: US 12,132,505 B2
(45) Date of Patent: Oct. 29, 2024

(54) ANTENNA MODULE PERFORMING INTER-BAND CARRIER AGGREGATION AND ELECTRONIC DEVICE INCLUDING THE SAME

(71) Applicant: Samsung Electronics Co., Ltd., Suwon-si (KR)

(72) Inventor: Byongok Kwun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 283 days.

(21) Appl. No.: 17/435,576

(22) PCT Filed: Aug. 31, 2021

(86) PCT No.: PCT/KR2021/011690
§ 371 (c)(1),
(2) Date: Sep. 1, 2021

(87) PCT Pub. No.: WO2022/050660
PCT Pub. Date: Mar. 10, 2022

(65) Prior Publication Data
US 2022/0329267 A1   Oct. 13, 2022

(30) Foreign Application Priority Data
Sep. 1, 2020  (KR) .......................... 10-2020-0111256

(51) Int. Cl.
*H04L 12/00* (2006.01)
*H04B 1/00* (2006.01)
*H04B 7/10* (2017.01)

(52) U.S. Cl.
CPC ............. *H04B 1/0057* (2013.01); *H04B 7/10* (2013.01)

(58) Field of Classification Search
None
See application file for complete search history.

(56) References Cited

U.S. PATENT DOCUMENTS

2014/0328220 A1   11/2014   Khlat et al.
2014/0347222 A1*  11/2014   Ling .................... H01Q 25/007
                                                  342/373
(Continued)

FOREIGN PATENT DOCUMENTS

CN         106130570 A    11/2016
CN         106230471 A    12/2016
(Continued)

OTHER PUBLICATIONS

Nokia et al., FR2 intra-band non-contiguous UL CA feature, R4-2006486, 3GPP TSG-RAN4#95, May 27, 2020.
(Continued)

*Primary Examiner* — Noel R Beharry
*Assistant Examiner* — Lionel Preval
(74) *Attorney, Agent, or Firm* — Jefferson IP Law, LLP

(57) ABSTRACT

According to various embodiments, an electronic device is provided. The electronic device includes at least one communication processor, an intermediate frequency integrated circuit (IFIC) configured to output at least one of a first intermediate frequency (IF) signal corresponding to a first polarization characteristic and a second IF signal corresponding to a second polarization characteristic, based on a baseband signal generated from the at least one communication processor, a radio frequency integrated circuit (RFIC) configured to control at least one antenna element to generate a radio frequency (RF) signal, based on at least one of the first IF signal or the second IF signal, and an antenna array including at least one antenna element configured to generate and transmit the RF signal. The RFIC may include a first diplexer configured to receive the first IF signal and a second diplexer configured to receive the second IF signal.

14 Claims, 15 Drawing Sheets

(56) References Cited

U.S. PATENT DOCUMENTS

| | | |
|---|---|---|
| 2016/0087656 A1 | 3/2016 | Park |
| 2016/0365889 A1 | 12/2016 | Weissman et al. |
| 2016/0380652 A1 | 12/2016 | Anthony et al. |
| 2017/0279566 A1 | 9/2017 | Liu |
| 2017/0365914 A1 | 12/2017 | Hong et al. |
| 2019/0139912 A1 | 5/2019 | Kim et al. |
| 2019/0173184 A1 | 6/2019 | Kim et al. |
| 2019/0173195 A1 | 6/2019 | Kim et al. |
| 2019/0221917 A1 | 7/2019 | Kim et al. |
| 2019/0221947 A1* | 7/2019 | Zihir ............... H01Q 21/245 |
| 2019/0223033 A1* | 7/2019 | Nam ............... H04B 7/0805 |
| 2019/0334224 A1 | 10/2019 | Kim et al. |
| 2019/0372630 A1* | 12/2019 | Brunel ............... H04W 52/42 |
| 2020/0028597 A1 | 1/2020 | Al-Qaq et al. |
| 2020/0091608 A1 | 3/2020 | Alpman et al. |
| 2020/0106473 A1* | 4/2020 | Rong ............... H04B 1/40 |
| 2020/0244430 A1 | 7/2020 | Karabinis |
| 2021/0194515 A1 | 6/2021 | Go et al. |
| 2022/0094074 A1* | 3/2022 | Mori ............... H01Q 1/2283 |
| 2022/0337308 A1* | 10/2022 | Liberg ............... H04W 8/24 |

FOREIGN PATENT DOCUMENTS

| | | |
|---|---|---|
| EP | 3 179 554 A1 | 6/2017 |
| KR | 10-2006-0098505 A | 9/2006 |
| KR | 10-2016-0035842 A | 4/2016 |
| KR | 10-2017-0001607 A | 1/2017 |
| KR | 10-2017-0104238 A | 9/2017 |
| KR | 10-2017-0141998 A | 12/2017 |
| KR | 10-2018-0087095 A | 8/2018 |
| KR | 10-2019-0009232 A | 1/2019 |
| KR | 10-2019-0013381 A | 2/2019 |
| KR | 10-2019-0013382 A | 2/2019 |
| KR | 10-2019-0013383 A | 2/2019 |
| KR | 10-2019-0017607 A | 2/2019 |
| KR | 10-2019-0050576 A | 5/2019 |
| KR | 10-2019-0066939 A | 6/2019 |
| KR | 10-2019-0066940 A | 6/2019 |
| KR | 10-2019-0088213 A | 7/2019 |
| KR | 10-2019-0089955 A | 7/2019 |
| KR | 10-2019-0103677 A | 9/2019 |
| KR | 20-2019-0003031 U | 12/2019 |
| WO | 2017-125155 A1 | 7/2017 |

OTHER PUBLICATIONS

International Search Report dated Nov. 24, 2021, issued in International Application No. PCT/KR2021/011690.

Korean Office Action dated Jun. 7, 2024, issued in Korean Patent Application No. 10-2020-0111256.

* cited by examiner

ANTENNA MODULE PERFORMING INTER-BAND CARRIER AGGREGATION AND ELECTRONIC DEVICE INCLUDING THE SAME

CROSS-REFERENCE TO RELATED APPLICATION(S)

This application is a U.S. National Stage application under 35 U.S.C. § 371 of an International application number PCT/KR2021/011690, filed on Aug. 31, 2021, which is based on and claims priority of a Korean patent application number 10-2020-0111256, filed on Sep. 1, 2020, in the Korean Intellectual Property Office, the disclosure of each of which is incorporated by reference herein in its entirety.

TECHNICAL FIELD

The disclosure relates to an antenna module for performing inter-band carrier aggregation and an electronic device including the antenna module.

BACKGROUND ART

Mobile communication systems may adopt carrier aggregation (CA) that adds a component carrier (CC) to increase data rate without influencing legacy user equipment (UE) using a single carrier.

CA may be divided into inter-band CA, in which CCs exist in the same frequency band, and inter-band CA, in which CCs exist in different frequency bands, according to carrier frequency allocation of each CC.

The above information is presented as background information only to assist with an understanding of the disclosure. No determination has been made, and no assertion is made, as to whether any of the above might be applicable as prior art with regard to the disclosure.

DISCLOSURE

Technical Problem

In cases where an electronic device performs fifth generation (5G) communication using inter-band CA in an ultra-high frequency (mmWave) band (e.g., a 60 gigabyte (GHz) band), the electronic device typically has a plurality of communication modules to perform communication for performing high-frequency (e.g., mmWave) communication.

Aspects of the disclosure are to address at least the above-mentioned problems and/or disadvantages and to provide at least the advantages described below. According to various embodiments, an antenna module including a diplexer inside a radio frequency integrated circuit (RFIC). It is possible to perform inter-band CA using one antenna module for performing high-frequency (e.g., mmWave) communication by processing intermediate frequency band signals including different frequency components through the diplexer.

Additional aspects will be set forth in part in the description which follows and, in part, will be apparent from the description, or may be learned by practice of the presented embodiments.

Technical Solution

According to various embodiments, an electronic device is provided. The electronic device includes at least one communication processor, an intermediate frequency integrated circuit (IFIC) configured to output at least one of a first intermediate frequency (IF) signal corresponding to a first polarization characteristic or a second IF signal corresponding to a second polarization characteristic, based on a baseband signal generated from the at least one communication processor, a radio frequency integrated circuit (RFIC) configured to control at least one antenna element to generate a radio frequency (RF) signal, based on at least one of the first IF signal or the second IF signal, and an antenna array including at least one antenna element configured to generate and transmit the RF signal. The RFIC may include a first diplexer configured to receive the first IF signal and a second diplexer configured to receive the second IF signal. Each of the first IF signal and the second IF signal may include a first IF component and a second IF component. The first diplexer is configured to separate the first IF component and the second IF component included in the first IF signal, and the second diplexer are configured to separate the first IF component and the second IF component included in the second IF signal.

According to various embodiments, an antenna module is provided. The antenna module includes a first port configured to receive a first IF signal corresponding to a first polarization characteristic, from an intermediate frequency integrated circuit (IFIC) outputting an intermediate frequency (IF) signal based on a baseband signal, a second port configured to receive a second IF signal corresponding to a second polarization characteristic from the IFIC, a first diplexer connected with the first port and configured to separate a first IF component and a second IF component of the first IF signal, and a second diplexer connected with the second port and configured to separate a first IF component and a second IF component of the second IF signal.

According to various embodiments, an antenna module is provided. The antenna module includes an antenna array including at least one antenna element each including a first sub-unit configured to receive an RF signal having a first polarization characteristic and a second sub-unit configured to receive an RF signal having a second polarization characteristic, a first mixer converting an RF signal of a first frequency, among RF signals having the first polarization characteristic received through the first sub-unit, into a first intermediate frequency (IF) signal, a second mixer converting an RF signal of a second frequency, among RF signals having the first polarization characteristic received through the first sub-unit, into a second IF signal, a first diplexer configured to synthesize and output the first IF signal output from the first mixer and the second IF signal output from the second mixer, a third mixer converting an RF signal of the first frequency, among RF signals having the second polarization characteristic received through the second sub-unit, into a third intermediate frequency (IF) signal, a fourth mixer converting an RF signal of the second frequency, among the RF signals having the second polarization characteristic received through the second sub-unit, into a fourth IF signal, and a second diplexer configured to synthesize and output the third IF signal output from the third mixer and the fourth IF signal output from the fourth mixer.

Advantageous Effects

According to various embodiments, there is provided an antenna module and an electronic device including the antenna module. According to various embodiments, the electronic device may include an antenna module that includes a diplexer in a radio frequency integrated circuit (RFIC) and may process intermediate frequency band signals including different frequency components through the diplexer. Accordingly, according to various embodiments, the electronic device may simultaneously support the P-cell and the S-cell using one antenna module in a high frequency (e.g., mmWave) band inter-band CA situation.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of various embodiments. In addition, descriptions of well-known functions and constructions may be omitted for clarity and conciseness.

The terms and words used in the following description and claims are not limited to the bibliographical meanings, but, are merely used by the inventor to enable a clear and consistent understanding of various embodiments. Accordingly, it should be apparent to those skilled in the art that the following description of various embodiments of various embodiments is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
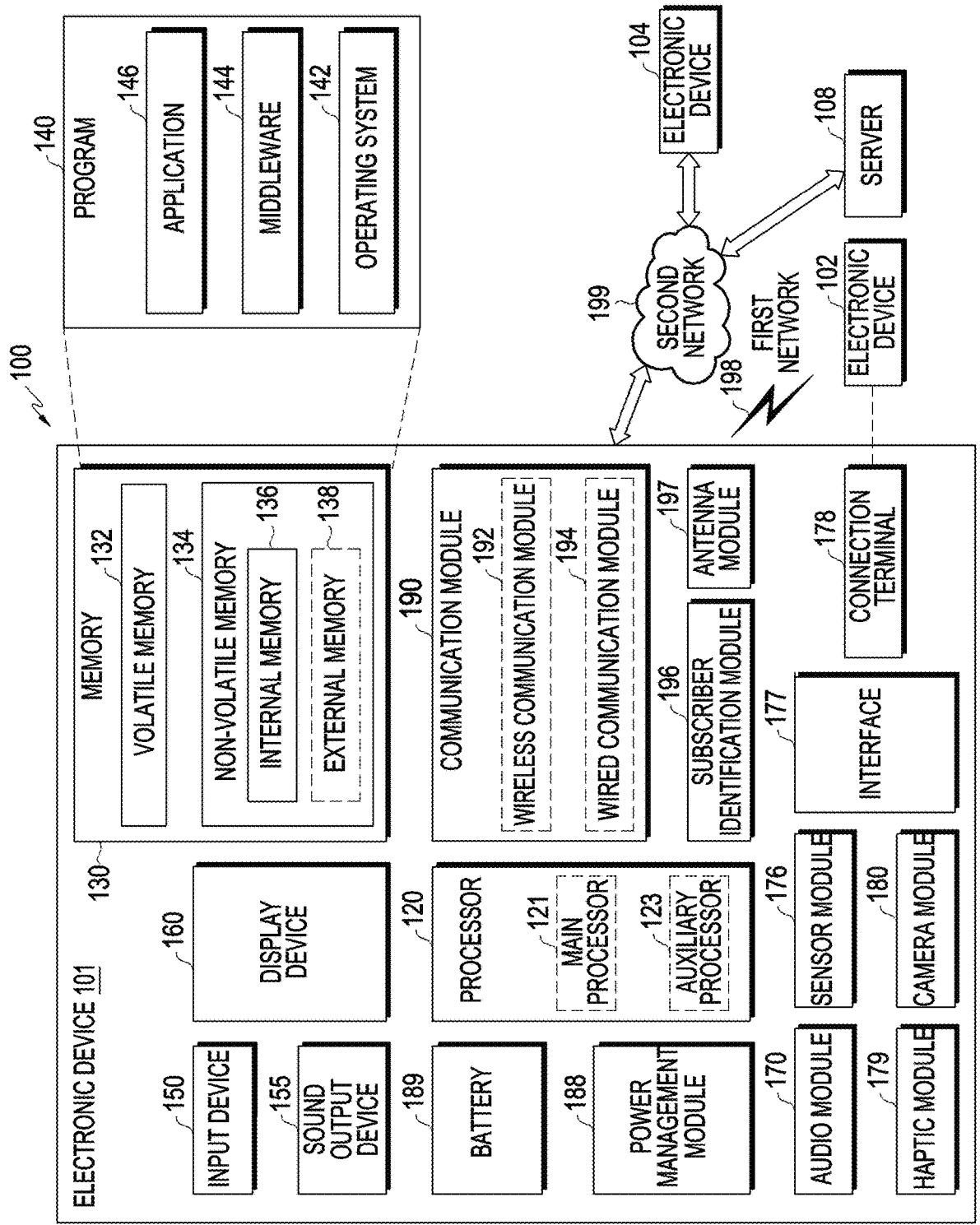
FIG. 1 is a view illustrating an electronic device in a network environment according to various embodiments.

FIG. 1 is a block diagram illustrating an electronic device in a network environment according to various embodiments. Referring to FIG. 1, an electronic device 101 in a network environment 100 may communicate with an external electronic device 102 via a first network 198 (e.g., a short-range wireless communication network), or an external electronic device 104 or a server 108 via a second network 199 (e.g., a long-range wireless communication network). According to various embodiments, the electronic device 101 may communicate with the external electronic device 104 via the server 108. According to various embodiments, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to various embodiments, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to various embodiments, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to various embodiments, the auxiliary processor 123 (e.g., an image signal processor or a communication processor) may be implemented as part of another component (e.g., the camera module 180 or the communication module 190) functionally related to the auxiliary processor 123. According to various embodiments, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to various embodiments, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to various embodiments, the display module 160 may include a touch sensor configured to detect a touch, or a pressure sensor configured to measure the intensity of a force generated by the touch.

The audio module 170 may convert a sound into an electrical signal and vice versa. According to various embodiments, the audio module 170 may obtain the sound via the input module 150, or output the sound via the sound output module 155 or a headphone of an external electronic device (e.g., an external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to various embodiments, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to various embodiments, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to various embodiments, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to various embodiments, the haptic module 179 may include, for example, a motor, a piezoelectric element, or an electric stimulator.

The camera module 180 may capture a still image or moving images. According to various embodiments, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to various embodiments, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to various embodiments, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to various embodiments, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to various embodiments, the antenna module 197 may include one antenna including a radiator formed of a conductor or conductive pattern formed on a substrate (e.g., a printed circuit board (PCB)). According to various embodiments, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to various embodiments, other parts (e.g., radio frequency integrated circuit (RFIC)) than the radiator may be further formed as part of the antenna module 197.

According to various embodiments, the antenna module 197 may form a mmWave antenna module. According to various embodiments, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to various embodiments, commands or data may be transmitted or received between the electronic device 101 and the external electronic device 104 via the server 108 coupled with the second network 199. The external electronic devices 102 or 104 each may be a device of the same or a different type from the electronic device 101. According to various embodiments, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to various embodiments, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
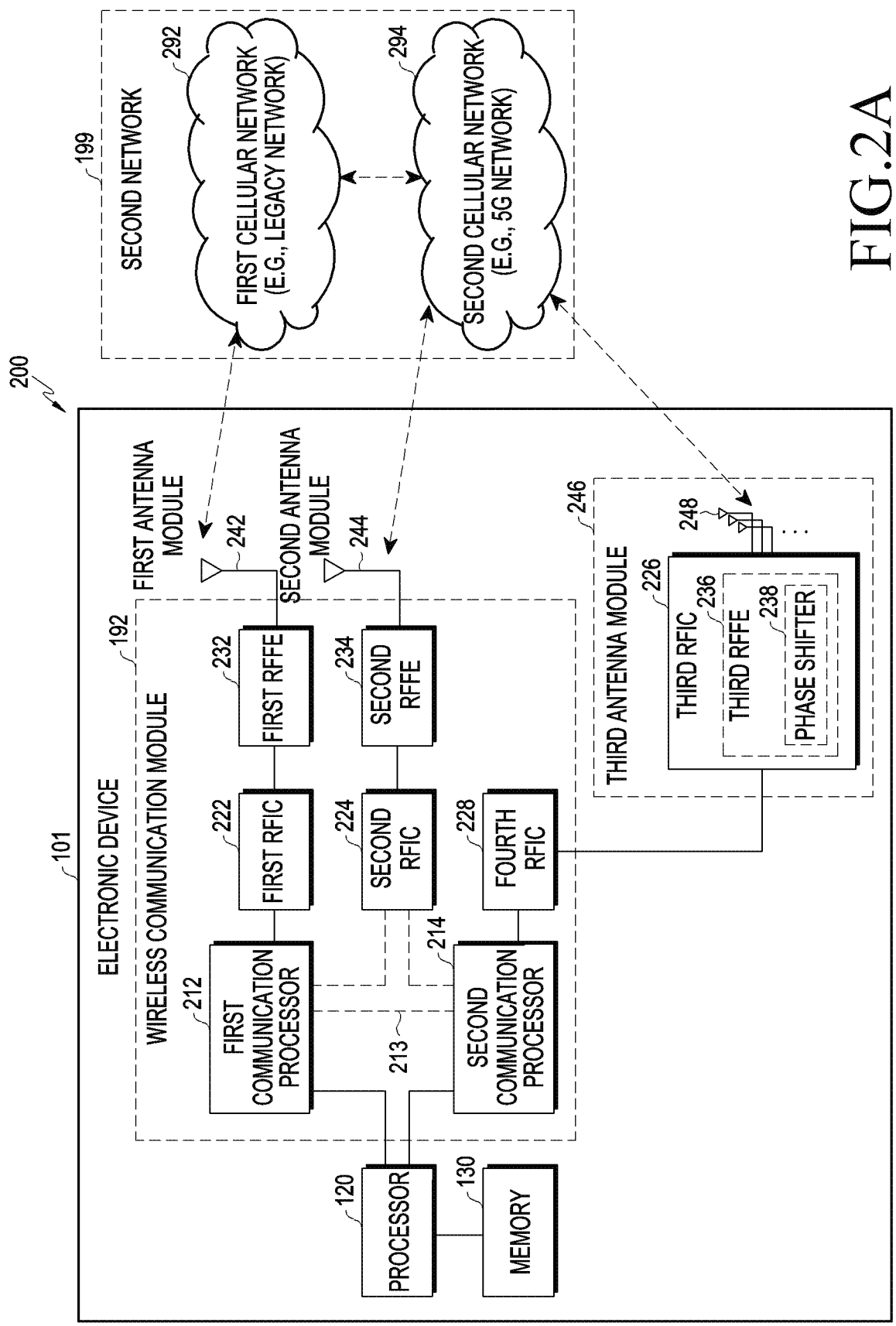
FIG. 2A is a block diagram illustrating an electronic device in a network environment including a plurality of cellular networks according to various embodiments.

FIG. 2A is a block diagram 200 of an electronic device 101 in a network environment including a plurality of cellular networks according to various embodiments. Referring to FIG. 2A, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130. The second network 199 may include a first cellular network 292 and a second cellular network 294. According to another embodiment, the electronic device 101 may further include at least one component among the components of FIG. 1, and the second network 199 may further include at least one other network. According to various embodiments, the first communication processor 212, the second communication processor 214, the first RFIC 222, the second RFIC 224, the fourth RFIC 228, the first RFFE 232, and the second RFFE 234 may form at least part of the wireless communication module 192. According to another embodiment, the fourth RFIC 228 may be omitted or be included as part of the third RFIC 226.

The first communication processor 212 may establish a communication channel of a band that is to be used for wireless communication with the first cellular network 292 or may support legacy network communication via the established communication channel. According to various embodiments, the first cellular network may be a legacy network that includes second generation (2G), third generation (3G), fourth generation (4G), or long-term evolution (LTE) networks. The second communication processor 214 may establish a communication channel corresponding to a designated band (e.g., from about 6 GHz to about 60 GHz) among bands that are to be used for wireless communication with the second cellular network 294 or may support fifth generation (5G) network communication via the established communication channel According to various embodiments, the second cellular network 294 may be a 5G network defined by the 3rd generation partnership project (3GPP). Additionally, according to various embodiments, the first communication processor 212 or the second communication processor 214 may establish a communication channel corresponding to another designated band (e.g., about 6 GHz or less) among the bands that are to be used for wireless communication with the second cellular network 294 or may support fifth generation (5G) network communication via the established communication channel According to various embodiments, the first communication processor 212 and the second communication processor 214 may be implemented in a single chip or a single package. According to various embodiments, the first communication processor 212 or the second communication processor 214, along with the processor 120, an auxiliary processor 123, or communication module 190, may be formed in a single chip or single package. According to various embodiments, the first communication processor 212 and the second communication processor 214 may be connected together directly or indirectly by an interface (not shown) to provide or receive data or control signals unilaterally or bi-laterally.

According to implementation, the first communication processor 212 may not be directly connected with the second communication processor 214. In this case, the first communication processor 212 may transmit/receive data to/from the second communication processor 214 via a processor 120 (e.g., an application processor). For example, the first communication processor 212 and the second communication processor 214 may transmit/receive data to/from the processor 120 (e.g., an application processor) via an US-UART interface or PCIe interface, but the kind of the interface is not limited thereto. The first communication processor 212 and the second communication processor 214 may exchange control information and packet data information with the processor 120 (e.g., an application processor) using a shared memory.

Figure 2B:
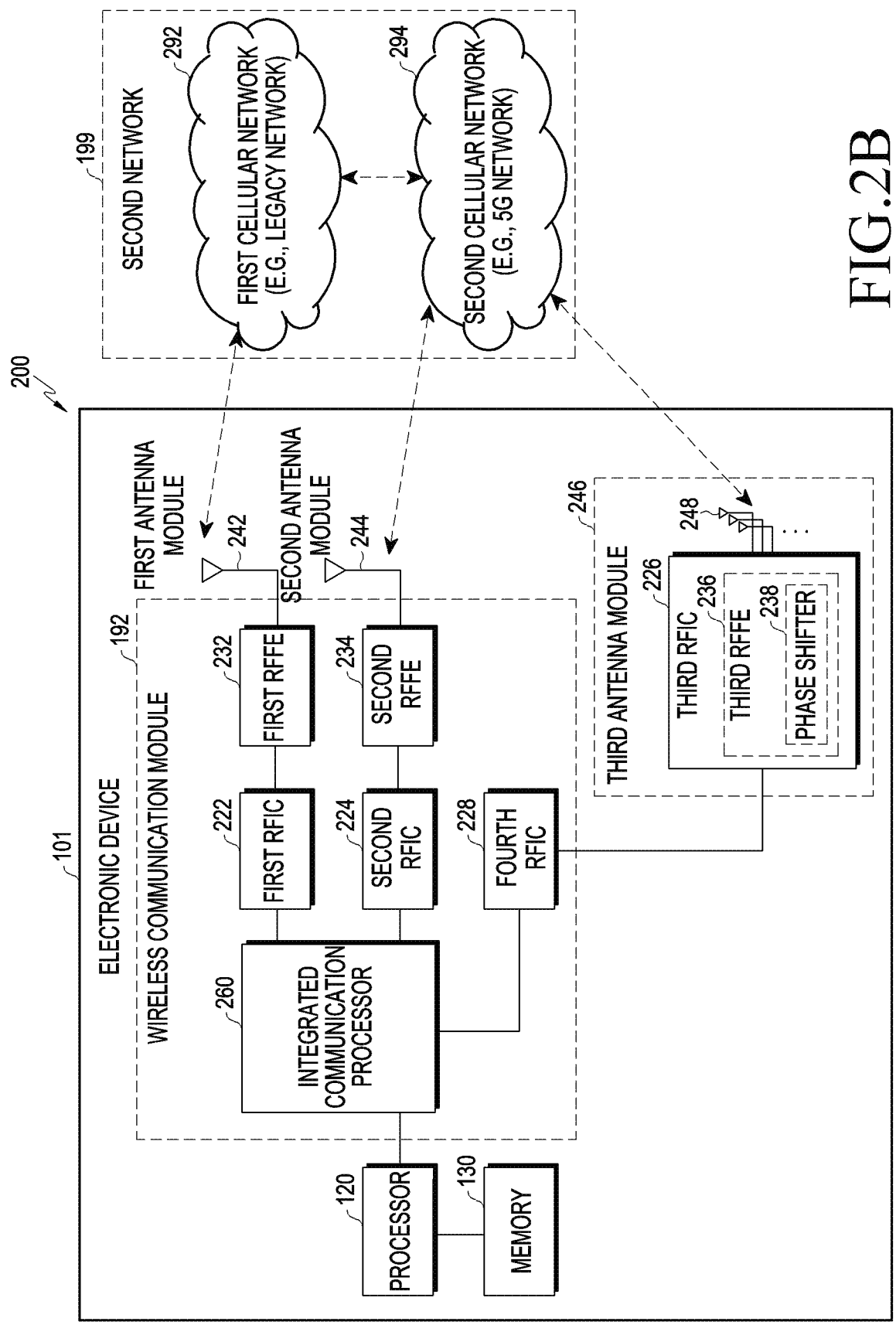
FIG. 2B is a block diagram illustrating an electronic device in a network environment including a plurality of cellular networks according to various embodiments.

FIG. 2B is a block diagram illustrating an electronic device in a network environment including a plurality of cellular networks according to various embodiments.

According to various embodiments, the first communication processor 212 and the second communication processor 214 may be implemented in a single chip or a single package. According to various embodiments, the first communication processor 212 or the second communication processor 214, along with the processor 120, an auxiliary processor 123, or communication module 190, may be formed in a single chip or single package.

For example, as shown in FIG. 2B, an integrated communication processor 260 may support all of the functions for communication with the first cellular network and the second cellular network.

Upon transmission, the first RFIC 222 may convert a baseband signal generated by the first communication processor 212 into a radio frequency (RF) signal with a frequency ranging from about 700 MHz to about 3 GHz which is used by the first cellular network 292 (e.g., a legacy network). Upon receipt, the RF signal may be obtained from the first cellular network 292 (e.g., a legacy network) through an antenna (e.g., the first antenna module 242) and be pre-processed via an RFFE (e.g., the first RFFE 232). The first RFIC 222 may convert the pre-processed RF signal into a baseband signal that may be processed by the first communication processor 212.

Upon transmission, the second RFIC 224 may convert the baseband signal generated by the first communication processor 212 or the second communication processor 214 into a Sub6-band (e.g., about 6 GHz or less) RF signal (hereinafter, "5G Sub6 RF signal") that is used by the second cellular network 294 (e.g., a 5G network). Upon receipt, the 5G Sub6 RF signal may be obtained from the second cellular network 294 (e.g., a 5G network) through an antenna (e.g., the second antenna module 244) and be pre-processed via an RFFE (e.g., the second RFFE 234). The second RFIC 224 may convert the pre-processed 5G Sub6 RF signal into a baseband signal that may be processed by a corresponding processor of the first communication processor 212 and the second communication processor 214.

The third RFIC 226 may convert the baseband signal generated by the second communication processor 214 into a 5G Above6 band (e.g., from about 6 GHz to about 60 GHz) RF signal (hereinafter, "5G Above6 RF signal") that is to be used by the second cellular network 294 (e.g., a 5G network). Upon receipt, the 5G Above6 RF signal may be obtained from the second cellular network 294 (e.g., a 5G network) through an antenna (e.g., the antenna 248) and be pre-processed via the third RFFE 236. The third RFIC 226 may convert the pre-processed 5G Above6 RF signal into a baseband signal that may be processed by the second communication processor 214. According to various embodiments, the third RFFE 236 may be formed as part of the third RFIC 226.

According to various embodiments, the electronic device 101 may include the fourth RFIC 228 separately from, or as at least part of, the third RFIC 226. In this case, the fourth RFIC 228 may convert the baseband signal generated by the second communication processor 214 into an intermediate frequency band (e.g., from about 9 GHz to about 11 GHz) RF signal (hereinafter, "IF signal") and transfer the IF signal to the third RFIC 226. The third RFIC 226 may convert the IF signal into a 5G Above6 RF signal. Upon receipt, the 5G Above6 RF signal may be received from the second cellular network 294 (e.g., a 5G network) through an antenna (e.g., the antenna 248) and be converted into an IF signal by the third RFIC 226. The fourth RFIC 228 may convert the IF signal into a baseband signal that may be processed by the second communication processor 214.

According to various embodiments, the first RFIC 222 and the second RFIC 224 may be implemented as at least part of a single chip or single package. According to various embodiments, the first RFFE 232 and the second RFFE 234 may be implemented as at least part of a single chip or single package. According to various embodiments, at least one of the first antenna module 242 or the second antenna module 244 may be omitted or be combined with another antenna module to process multi-band RF signals.

According to various embodiments, the third RFIC 226 and the antenna 248 may be disposed on the same substrate to form the third antenna module 246. For example, the wireless communication module 192 or the processor 120 may be disposed on a first substrate (e.g., a main painted circuit board (PCB)). In this case, the third RFIC 226 and the antenna 248, respectively, may be disposed on one area (e.g., the bottom) and another (e.g., the top) of a second substrate (e.g., a sub PCB) which is provided separately from the first substrate, forming the third antenna module 246. Placing the third RFIC 226 and the antenna 248 on the same substrate may shorten the length of the transmission line therebetween. This may reduce a loss (e.g., attenuation) of high-frequency band (e.g., from about 6 GHz to about 60 GHz) signal used for 5G network communication due to the transmission line. Thus, the electronic device 101 may enhance the communication quality with the second cellular network 294 (e.g., a 5G network).

According to various embodiments, the antenna 248 may be formed as an antenna array which includes a plurality of antenna elements available for beamforming. In this case, the third RFIC 226 may include a plurality of phase shifters 238 corresponding to the plurality of antenna elements, as part of the third RFFE 236. Upon transmission, the plurality of phase shifters 238 may change the phase of the 5G Above6 RF signal which is to be transmitted to the outside (e.g., a 5G network base station) of the electronic device 101 via their respective corresponding antenna elements. Upon receipt, the plurality of phase shifters 238 may change the phase of the 5G Above6 RF signal received from the outside to the same or substantially the same phase via their respective corresponding antenna elements. This enables transmission or reception via beamforming between the electronic device 101 and the outside.

The second cellular network 294 (e.g., a 5G network) may be operated independently (e.g., as standalone (SA)) from, or in connection (e.g., as non-standalone (NSA)) with the first cellular network 292 (e.g., a legacy network). For example, the 5G network may include access networks (e.g., 5G access networks (RANs)) but lack any core network (e.g., a next-generation core (NGC)). In this case, the electronic device 101, after accessing a 5G network access network, may access an external network (e.g., the Internet) under the control of the core network (e.g., the evolved packet core (EPC)) of the legacy network. Protocol information (e.g., LTE protocol information) for communication with the legacy network or protocol information (e.g., New Radio (NR) protocol information) for communication with the 5G network may be stored in the memory 230 and be accessed by other components (e.g., the processor 120, the first communication processor 212, or the second communication processor 214).

Figure 3A:
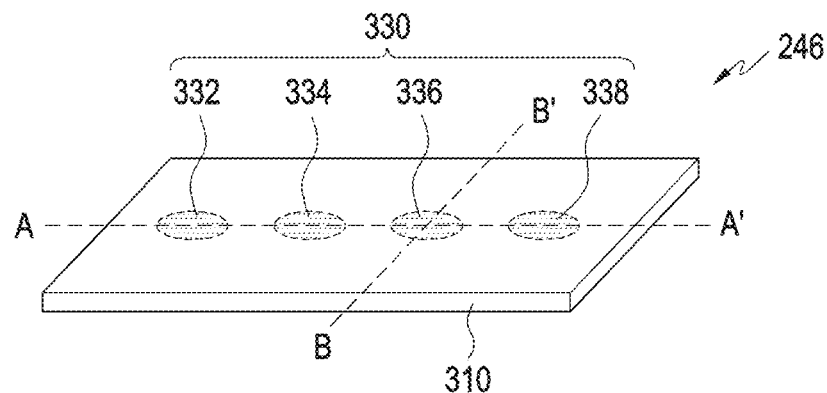
FIGS. 3A, 3B, and 3C illustrate various embodiments of an antenna module structure according to various embodiments.
Figure 3B:
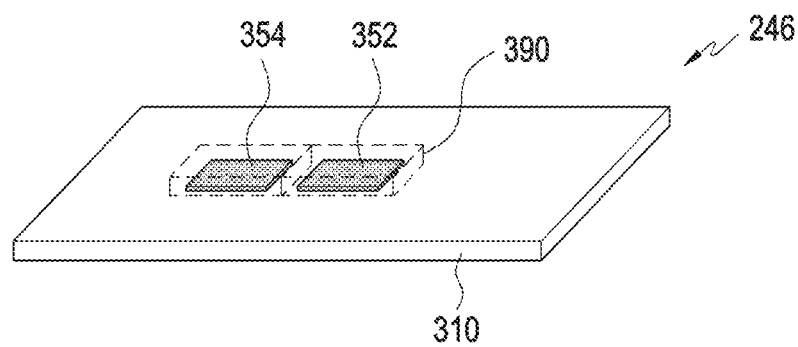
Figure 3C:
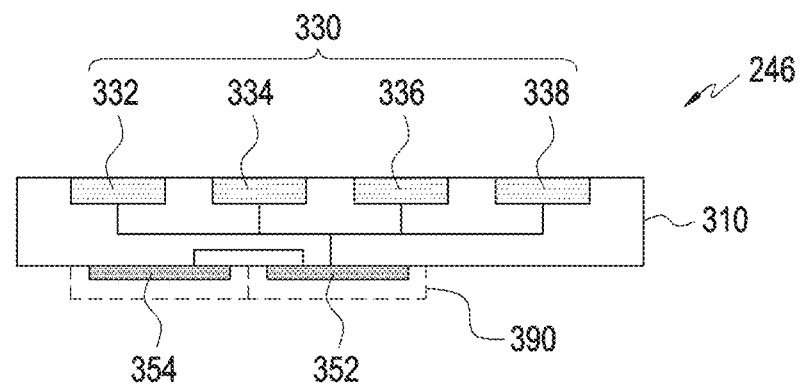

FIGS. 3A, 3B, and 3C illustrate various embodiments of an antenna module structure of the third antenna module 246 described above in connection with, e.g., FIGS. 2A and 2B, according to various embodiments. FIG. 3A is a perspective view of the third antenna module 246 as viewed from one side, and FIG. 3B is a perspective view of the third antenna module 246 as viewed from another side. FIG. 3C is a cross-sectional view of the third antenna module 246 taken along line A-A'.

Referring to FIGS. 3A, 3B, and 3C, according to various embodiments, the third antenna module 246 may include a printed circuit board 310, an antenna array 330, a radio frequency integrated circuit (RFIC) 352, a power management integrated circuit (PMIC) 354, and a module interface 370. Selectively, the third antenna module 246 may further include a shielding member 390. According to other embodiments, at least one of the above-mentioned components may be omitted, or at least two of the components may be integrally formed with each other.

The printed circuit board 310 may include a plurality of conductive layers and a plurality of non-conductive layers alternately stacked with the conductive layers. Electronic components arranged on, or outside of, the printed circuit board 310 may be electrically connected together via wires and conductive vias formed on or through the conductive layers.

The antenna array 330 (e.g., 248 of FIGS. 2A and 2B) may include a plurality of antenna elements 332, 334, 336, or 338 arranged to form directional beams. The antenna elements may be formed on a first surface of the printed circuit board 310 as shown. According to another embodiment, the antenna array 330 may be formed inside the printed circuit board 310. According to various embodiments, the antenna array 330 may include a plurality of antenna arrays (e.g., a dipole antenna array and/or a patch antenna array) of the same or different shapes or kinds.

The RFIC 352 (e.g., 226 of FIGS. 2A and 2B) may be disposed in another area (e.g., a second surface opposite to the first surface) of the printed circuit board 310 which is spaced apart from the antenna array. The RFIC is configured to be able to process signals of a selected frequency band which are transmitted or received via the antenna array 330. According to various embodiments, upon transmission, the RFIC 352 may convert a baseband signal obtained from a communication processor (not shown) into a designated band of RF signal. Upon receipt, the RFIC 352 may convert the RF signal received via the antenna array 330 into a baseband signal and transfer the baseband signal to the communication processor.

According to another embodiment, upon transmission, the RFIC 352 may up-convert an IF signal (e.g., ranging from about 9 GHz to about 11 GHz) obtained from the intermediate frequency integrated circuit (IFIC) (e.g., 228 of FIGS. 2A and 2B) into a selected band of RF signal. Upon receipt, the RFIC 352 may down-convert the RF signal obtained via the antenna array 330 into an IF signal and transfer the IF signal to the IFIC.

The PMIC 354 may be disposed in another portion (e.g., the second surface) of the printed circuit board 310 which is spaced apart from the antenna array. The PMIC may receive a voltage from the main PCB (not shown) and provide necessary power to various components (e.g., the RFIC 352) on the antenna module.

The shielding member 390 may be disposed in a portion (e.g., the second surface) of the printed circuit board 310 to electromagnetically shield off at least one of the RFIC 352 or the PMIC 354. According to various embodiments, the shielding member 390 may include a shield can.

Although not shown, according to various embodiments, the third antenna module 246 may be electrically connected with another printed circuit board (e.g., the main printed circuit board) via the module interface. The module interface may include a connecting member, e.g., a coaxial cable connector, board-to-board connector, interposer, or flexible printed circuit board (FPCB). The RFIC 352 and/or the PMIC 354 may be electrically connected with the printed circuit board via the connecting member.

Figure 4:
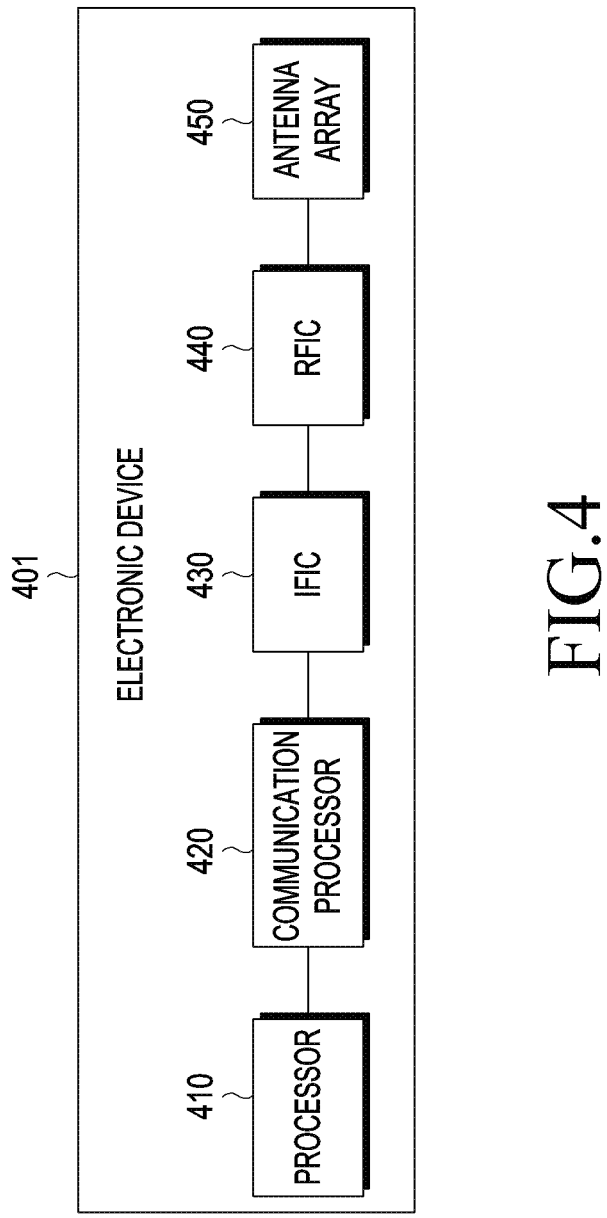
FIG. 4 is a block diagram illustrating an electronic device including an antenna module according to various embodiments.

FIG. 4 is a block diagram illustrating an electronic device including an antenna module according to various embodiments.

Referring to FIG. 4, an electronic device 401 may include a processor 410, a communication processor 420, an IFIC 430, an RFIC 440, and an antenna array 450. According to various embodiments, the RFIC 440 and the antenna array 450 may be included in an antenna module.

According to various embodiments, the electronic device 401 may be the electronic device 101. For simplicity of description, other components than the processor 410, the communication processor 420, the IFIC 430, the RFIC 440, and the antenna array 450 among the components included in the electronic device 401 are omitted from FIG. 4. According to various embodiments, the processor 410 may be the processor 120. According to various embodiments, the communication processor 420 may be the second communication processor 214 of FIG. 2A or the integrated communication processor 260 of FIG. 2B. According to various embodiments, the IFIC 430 may be the fourth RFIC 228 of FIG. 2A or 2B. According to various embodiments, the RFIC 440 may be the third RFIC 226 of FIG. 2A or 2B. According to various embodiments, the antenna array 450 may be the antenna 248 of FIG. 2A or 2B. According to various embodiments, the antenna array 450 may include at least one antenna element (e.g., the plurality of antenna elements 332, 334, 336, or 338 illustrated in FIGS. 3A, 3B, and 3C).

According to various embodiments, the communication processor 420 may generate a baseband signal based on a control signal from the processor 120. The baseband signal generated by the communication processor 420 may be transferred to the IFIC 430. The IFIC 430 may transfer one or more intermediate frequency band signals to the RFIC 440 based on the baseband signal.

According to various embodiments, the intermediate frequency band signal transferred from the IFIC 430 to the RFIC 440 may include at least one of a first intermediate frequency (IF) band signal (hereinafter, a "first IF signal"), which corresponds to a first polarization characteristic and belongs to a first intermediate frequency band, and a second intermediate frequency band signal (hereinafter, a "second IF signal"), which corresponds to a second polarization characteristic and belongs to a second intermediate frequency band. According to various embodiments, an interface (e.g., a port) for transferring the first IF signal and an interface (e.g., a port) for transferring the second IF signal may be separately disposed between the IFIC 430 and the RFIC 440.

According to various embodiments, when the first IF signal corresponds to the first polarization characteristic, this may mean that the first IF signal controls the antenna array 450 to allow the RFIC 440 to transmit a signal having the first polarization characteristic. Likewise, when the second IF signal corresponds to the second polarization characteristic, this may mean that the second IF signal controls the antenna array 450 to allow the RFIC 440 to transmit a signal having the second polarization characteristic. According to various embodiments, having the first polarization characteristic may mean having an electric field polarized in a direction perpendicular to the ground. According to various embodiments, having the second polarization characteristic may mean having an electric field polarized in a direction horizontal to the ground.

According to various embodiments, the RFIC 440 may control at least one antenna element included in the antenna array 450 to generate a radio frequency (RF) signal based on at least one of the first IF signal and the second IF signal received from the IFIC 430.

According to various embodiments, at least one antenna element (e.g., the antenna elements 332, 334, 336, and/or 338 of FIGS. 3A, 3B, and 3C) included in the antenna array 450 may include a first sub-unit configured to generate and transmit an RF signal having the first polarization characteristic and a second sub-unit configured to generate and transmit an RF signal having the second polarization characteristic.

According to various embodiments, the first sub-unit included in the antenna element (e.g., the antenna element 332, 334, 336, and/or 338 of FIGS. 3A, 3B, and 3C) may include a first feeding unit configured to generate an RF signal having the first polarization characteristic. The second sub-unit may include a second feeding unit configured to generate an RF signal having the second polarization characteristic.

According to various embodiments, the antenna array 450 may perform 5G communication in an inter-band CA situation in a high frequency (e.g., mmWave) band based on a signal from the RFIC 440.

Figure 5:
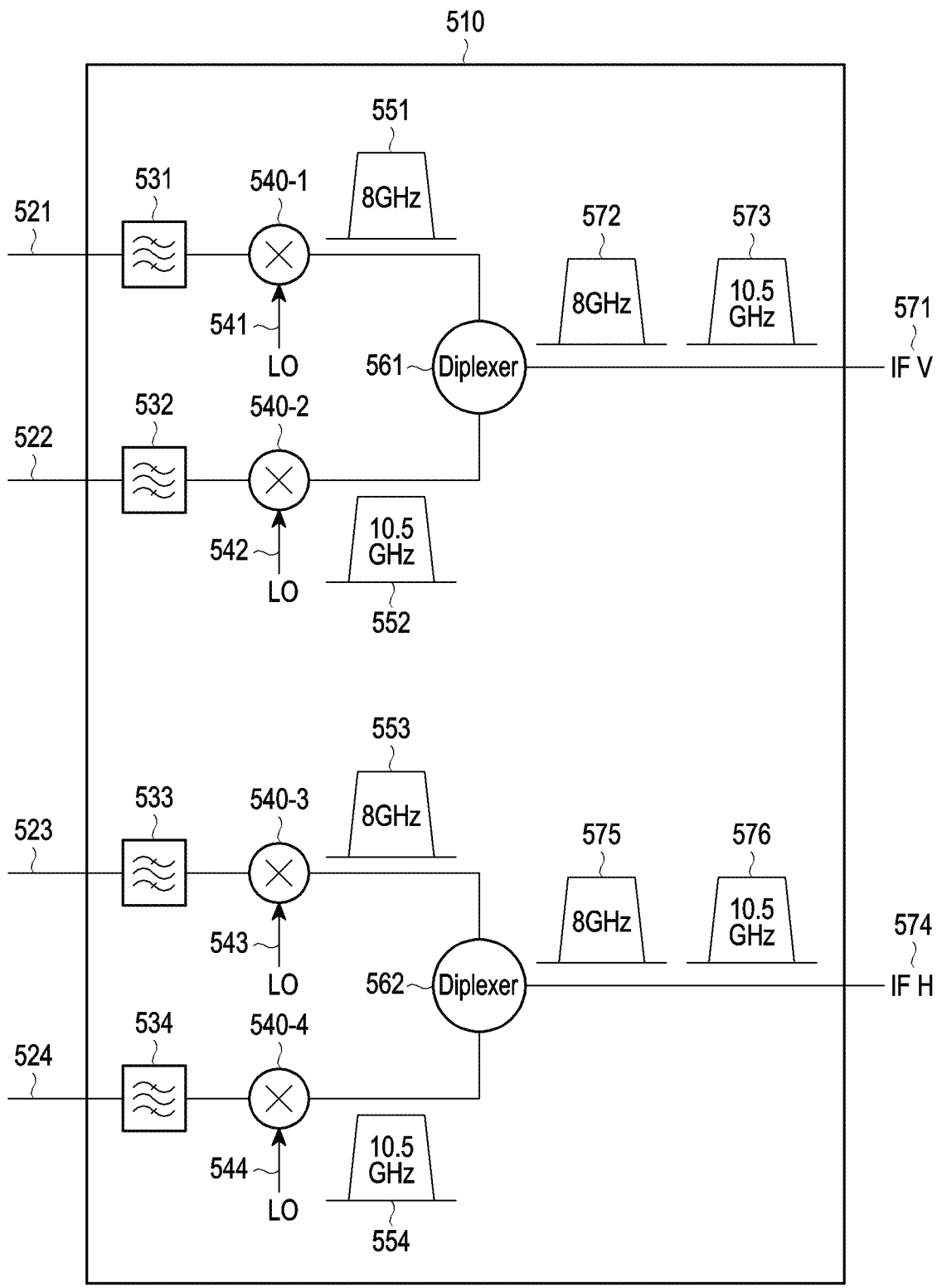
FIG. 5 is a block diagram illustrating an intermediate frequency integrated circuit (IFIC) according to various embodiments.

FIG. 5 is a block diagram illustrating an IFIC according to various embodiments.

Referring to FIG. 5, according to various embodiments, an IFIC 510 may include a plurality of bandpass filters 531, 532, 533, and/or 534, a plurality of mixers 540-1, 540-2, 540-3, and 540-4, and a plurality of diplexers 561 and/or 562. According to various embodiments, the IFIC 510 may receive, through a port 521, a baseband signal generated by a communication processor (e.g., the communication processor 420) and corresponding to the first polarization characteristic. Here, when the baseband signal corresponds to the first polarization characteristic, this may mean that the baseband signal is a signal for outputting a signal having the first polarization characteristic. The signal received through the port 521 may pass through a bandpass filter 531 that passes a designated baseband frequency component, and the signal transmitted through the bandpass filter 531 may be frequency-converted into a first frequency (e.g., 8 GHz) by an oscillator 541 through a mixer 540-1, and the frequency-converted signal may be input to the diplexer 561. Here, the signal output from the bandpass filter 531 may be referred to as a first baseband signal.

According to various embodiments, the IFIC 510 may receive, through a port 522, a baseband signal generated by a communication processor (e.g., the communication processor 420) and corresponding to the first polarization characteristic. The signal received through the port 522 may pass through a bandpass filter 532 that passes a designated baseband frequency component, different from the bandpass filter 531, and the signal transmitted through the bandpass filter 532 may be frequency-converted into a second frequency (e.g., 10.5 GHz) by an oscillator 542 through a mixer 540-2, and the frequency-converted signal may be input to the diplexer 561. Here, the signal output from the bandpass filter 532 may be referred to as a second baseband signal.

Although FIG. 5 illustrates an example in which the first frequency is 8 GHz and the second frequency is 10.5 GHz, the first frequency and the second frequency may be set to other various frequencies according to various embodiments.

According to various embodiments, the diplexer 561 may synthesize and output the signal 551 whose frequency has been converted into the first frequency (e.g., 8 GHz) by the local oscillator 541 and the signal 552 whose frequency has been converted into the second frequency (e.g., 10.5 GHz) by the local oscillator 542. The signal output from the diplexer 561 may be referred to as a first IF signal 571 and may include a first IF component 572 having the first frequency and a second IF component 573 having the second frequency.

According to various embodiments, the IFIC 510 may receive, through a port 523, a baseband signal generated by a communication processor (e.g., the communication processor 420) and corresponding to the second polarization characteristic. Here, when the baseband signal corresponds to the second polarization characteristic, this may mean that the baseband signal is a signal for outputting a signal having the second polarization characteristic. The signal received through the port 523 may pass through a bandpass filter 533 that passes a designated baseband frequency component, and the signal transmitted through the bandpass filter 533 may be frequency-converted into a first frequency (e.g., 8 GHz) by an oscillator 543 through a mixer 540-3, and the frequency-converted signal may be input to the diplexer 562. Here, the signal output from the bandpass filter 533 may be referred to as a third baseband signal.

According to various embodiments, the IFIC 510 may receive, through a port 524, a baseband signal generated by a communication processor (e.g., the communication processor 420) and corresponding to the second polarization characteristic. The signal received through the port 524 may pass through a bandpass filter 534 that passes a designated baseband frequency component, different from the bandpass filter 533, and the signal transmitted through the bandpass filter 534 may be frequency-converted into a second frequency (e.g., 10.5 GHz) by an oscillator 544 through a mixer 540-4, and the frequency-converted signal may be input to the diplexer 562. Here, the signal output from the bandpass filter 534 may be referred to as a fourth baseband signal.

According to various embodiments, the diplexer 562 may synthesize and output the signal 553 whose frequency has been converted into the first frequency (e.g., 8 GHz) by the local oscillator 543 and the signal 554 whose frequency has been converted into the second frequency (e.g., 10.5 GHz) by the local oscillator 544. The signal output from the diplexer 562 may be referred to as a second IF signal 574 and may include a third IF component 575 having the first frequency and a fourth IF component 576 having the second frequency.

According to various embodiments, the IFIC 510 may include a frequency converter (e.g., a mixer). For example, the IFIC 510 may convert the frequency of the signal received through a port (e.g., 521, 522, 523, and/or 524) using a frequency converter (e.g., a mixer). According to various embodiments, the diplexer 561 and/or 562 may include a triplexer. For example, the IFIC 510 may include a plurality of bandpass filters 531, 532, 533, and/or 534, a plurality of mixers 540-1, 540-2, 540-3, and/or 540-4, and a plurality of triplexers.

Figure 6A:
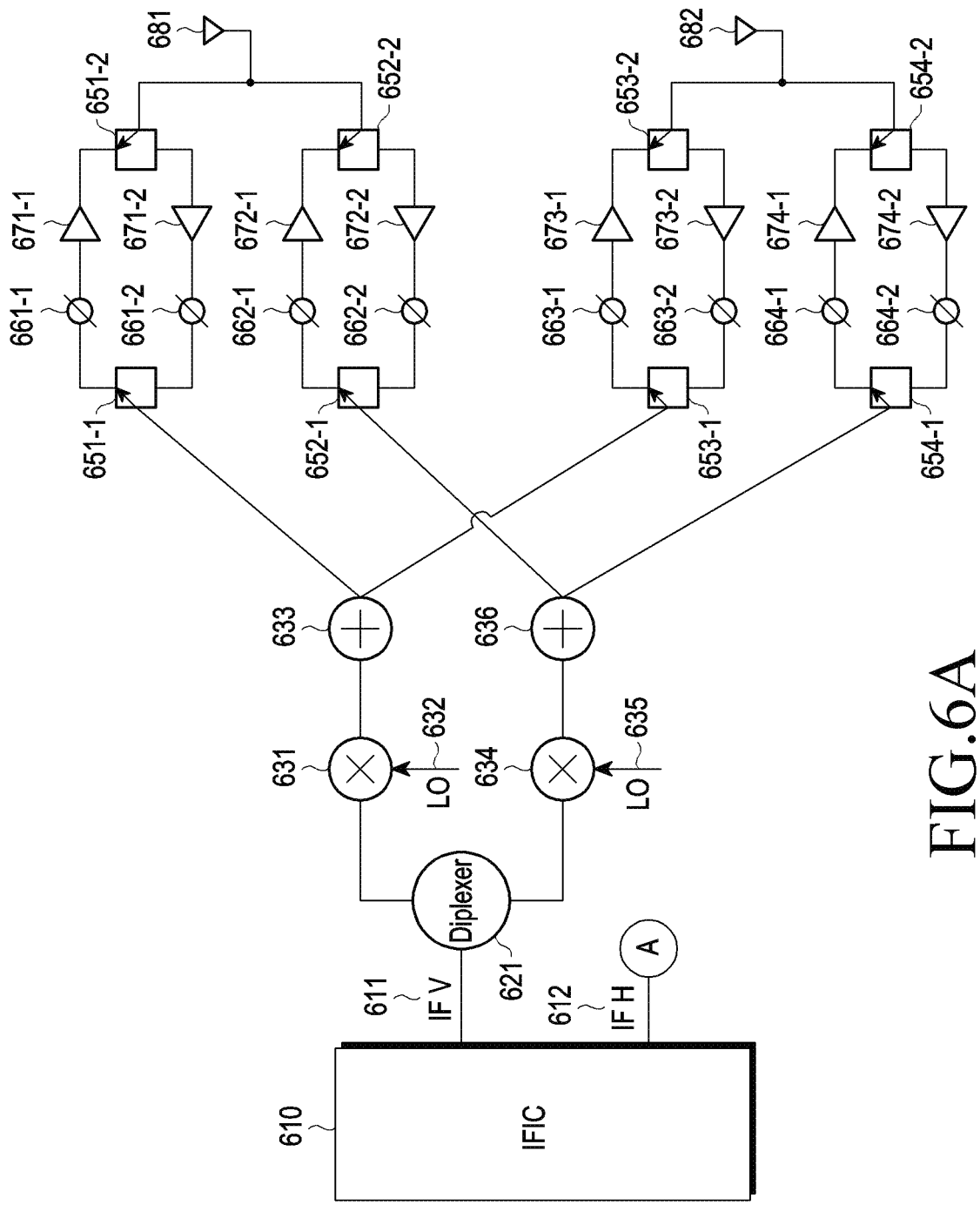
FIGS. 6A and 6B illustrate a structure of an antenna module connected to an IFIC according to various embodiments.
Figure 6B:
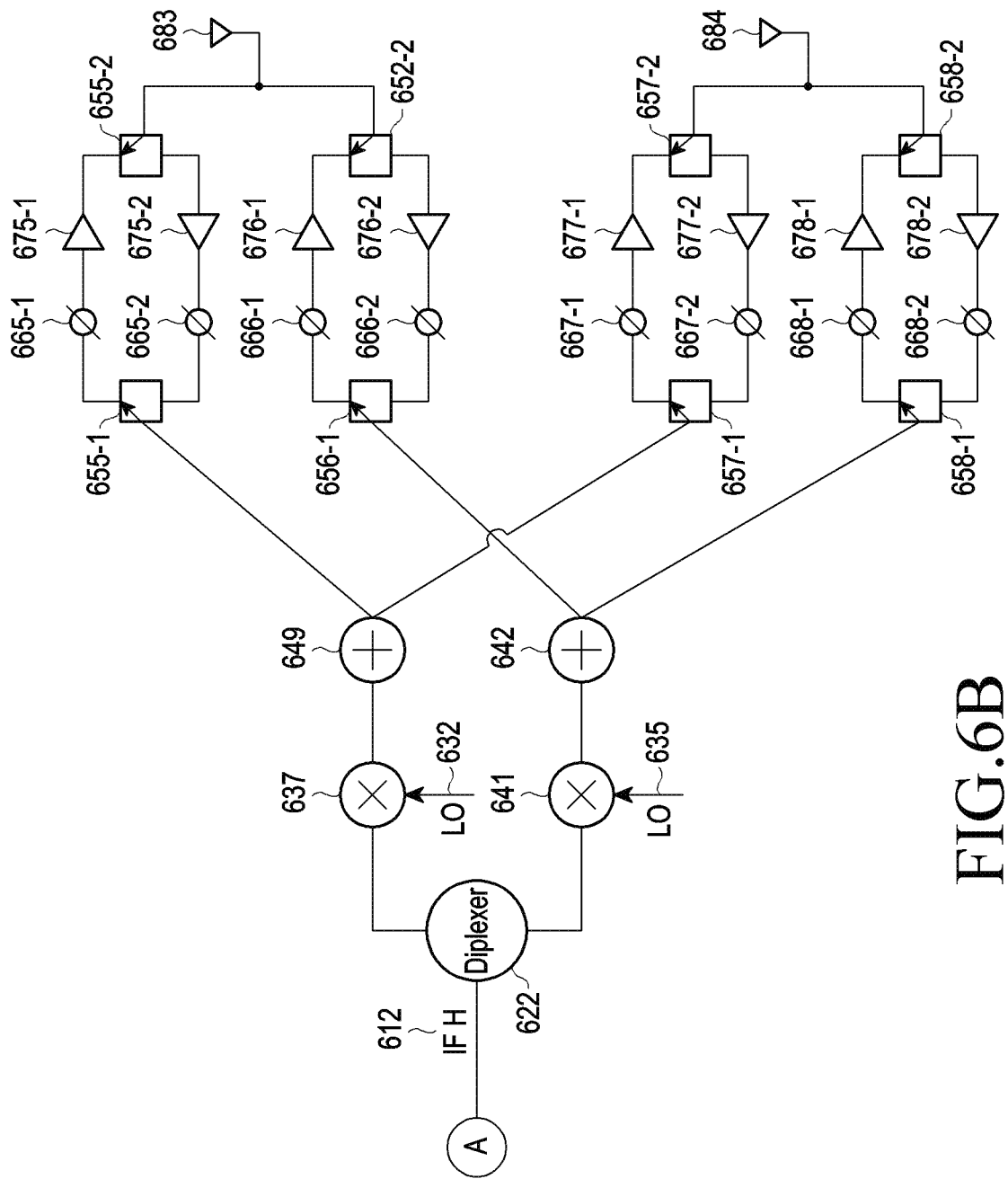

FIGS. 6A and 6B illustrate a structure of an antenna module connected to an IFIC according to various embodiments. FIG. 6A illustrates a portion of an antenna module that generates an RF signal having a first polarization characteristic by a first IF signal corresponding to the first polarization characteristic, and FIG. 6B illustrates another portion of the antenna module that generates an RF signal having a second polarization characteristic by a second IF signal transferred through the port 612 corresponding to the second polarization characteristic.

Referring to FIG. 6A, the IFIC 610 may be the IFIC 510 illustrated in FIG. 5. Further, the first IF signal transferred through the port 611 may be the first IF signal 571 illustrated in FIG. 5, and the second IF signal transferred through the port 612 may be the second IF signal illustrated in FIG. 5.

According to various embodiments, the antenna module may include an RFIC and an antenna array. Referring to FIG. 6A, the RFIC may include a first diplexer 621, a first mixer 631, a first divider 633, a second mixer 634, a second divider 636, a plurality of switches 651-1, 651-2, 652-1, 652-2, 653-1, 653-2, 654-1, and/or 654-2, a plurality of phase shifters 661-1, 661-2, 662-1, 662-2, 663-1, 663-2, 664-1, and/or 664-2, a plurality of amplifiers 671-1, 672-1, 673-1, and/or 673-1, and a plurality of low-noise amplifiers 671-2, 672-2, 673-2, and/or 673-2. According to various embodiments, in addition to the components illustrated in FIG. 6A, the RFIC may further include a second diplexer 622, a third mixer 637, a third divider 649, a fourth mixer 641, a fourth divider 642, plurality of switches 655-1, 655-2, 656-1, 656-2, 657-1, 657-2, 658-1, and/or 658-2, a plurality of phase shifters 665-1, 665-2, 666-1, 666-2, 667-1, 667-2, 668-1, and/or 668-2, a plurality of amplifiers 675-1, 676-1, 677-1, and/or 678-1, and a plurality of low-noise amplifiers 675-2, 676-2, 677-2, and/or 678-2 as illustrated in FIG. 6B.

According to various embodiments, the first diplexer 621 and/or the second diplexer 622 may be configured separately from the RFIC. For example, the first diplexer 621 may separate the first IF signal and/or the second IF signal transferred from the IFIC 610 into a first IF component having a first frequency (e.g., 8 GHz) and a second IF component having a second frequency (e.g., 10.5 GHz) and transfer them to the RFIC.

Referring to FIGS. 6A and 6B, the antenna array may include a plurality of antenna elements. Each of the plurality of antenna elements may include a first sub-unit configured to generate and transmit an RF signal having a first polarization characteristic and a second sub-unit configured to generate and transmit an RF signal having a second polarization characteristic. A sub-unit 681 of FIG. 6A may be a first sub-unit of a first antenna element, and a sub-unit 682 may be a first sub-unit of a second antenna element. Further, a sub-unit 683 of FIG. 6B may be a second sub-unit of the first antenna element, and a sub-unit 684 may be a second sub-unit of the second antenna element. Although FIGS. 6A and 6B illustrate that the antenna array includes two antenna elements, according to various embodiments, it may be understood by one of ordinary skill in the art that the antenna array may include three or more antenna elements even in which case details regarding the operation of the antenna module to be described below may be applied likewise.

Referring to FIG. 6A, the first IF signal transferred through the port 611 may be a signal corresponding to the first polarization characteristic. The first IF signal transferred through the port 611 may be input to the first diplexer 621, and the first diplexer 621 may separate the first IF signal into a first IF component having a first frequency (e.g., 8 GHz) and a second IF component having a second frequency (e.g., 10.5 GHz). The first IF component of the first IF signal may be input to the first mixer 631, and the frequency of the first IF component may be converted into a third frequency of an mmWave band by the first mixer 631 and the local oscillator 632. According to various embodiments, the third frequency may be 24 GHz or 28 GHz.

According to various embodiments, the signal of the third frequency output from the first mixer 631 may be transferred to the plurality of switches 651-1 and 653-1 by the first divider 633. The plurality of switches 651-1, 651-2, 653-1, and 653-2, respectively, may connect the first divider 633 and the first sub-unit 681 of the first antenna element and the first sub-unit 682 of the second antenna element with a plurality of phase shifters 661-1 and 663-1 and a plurality of amplifiers 671-1 and 673-1 corresponding to an uplink or through a plurality of phase shifters 661-2 and 663-2 and a plurality of low-noise amplifiers 671-2 and 673-2 corresponding to a downlink.

According to various embodiments, the plurality of phase shifters 661-1 and 663-1 may shift the phase of the signal of the third frequency output from the first divider 633, and the plurality of amplifiers 671-1 and 673-1 may amplify the signals output from the plurality of phase shifters 661-1 and 663-1, respectively, and transfer the amplified signals to the first sub-unit 681 of the first antenna element and the first sub-unit 682 of the second antenna element. The first sub-unit 681 of the first antenna element and the first sub-unit 682 of the second antenna element, respectively, may generate and transmit RF signals having the first polarization characteristic and the third frequency based on the signals output from the plurality of amplifiers 671-1 and 673-1 and transmitted through the plurality of switches 651-2 and 653-2.

According to various embodiments, the second IF component of the first IF signal may be input to the second mixer 634, and the frequency of the second IF component may be converted into a fourth frequency of an mmWave band by the second mixer 634 and the local oscillator 635. According to various embodiments, the fourth frequency may be 39 GHz.

According to various embodiments, the signal of the fourth frequency output from the second mixer 634 may be transferred to the plurality of switches 652-1 and 654-1 by the second divider 636. The plurality of switches 652-1, 652-2, 654-1, and 654-2, respectively, may connect the second divider 636 and the first sub-unit 681 of the first antenna element and the first sub-unit 682 of the second antenna element with a plurality of phase shifters 662-1 and 664-1 and a plurality of amplifiers 672-1 and 674-1 corresponding to an uplink or through a plurality of phase shifters 662-2 and 664-2 and a plurality of low-noise amplifiers 672-2 and 674-2 corresponding to a downlink.

According to various embodiments, the plurality of phase shifters 662-1 and 664-1 may shift the phase of the signal of the fourth frequency output from the second divider 636, and the plurality of amplifiers 672-1 and 674-1 may amplify the signals output from the plurality of phase shifters 662-1 and 664-1, respectively, and transfer the amplified signals to the first sub-unit 681 of the first antenna element and the first sub-unit 682 of the second antenna element. The first sub-unit 681 of the first antenna element and the first sub-unit 682 of the second antenna element, respectively, may generate and transmit RF signals having the first polarization characteristic and the fourth frequency based on the signals output from the plurality of amplifiers 672-1 and 674-1 and transmitted through the plurality of switches 652-2 and 654-2.

Referring to FIG. 6B, the second IF signal transferred through the port 612 may be a signal corresponding to the second polarization characteristic. The second IF signal transferred through the port 612 may be input to the second diplexer 622, and the second diplexer 622 may separate the second IF signal into a first IF component having a first frequency (e.g., 8 GHz) and a second IF component having a second frequency (e.g., 10.5 GHz). The first IF component of the second IF signal may be input to the third mixer 637, and the frequency of the first IF component may be converted into a third frequency of an mmWave band by the third mixer 637 and the local oscillator 632. According to various embodiments, the third frequency may be 24 GHz or 28 GHz.

According to various embodiments, the signal of the third frequency output from the third mixer 637 may be transferred to the plurality of switches 655-1 and 657-1 by the third divider 649. The plurality of switches 655-1, 655-2, 657-1, and 657-2, respectively, may connect the third divider 649 and the second sub-unit 683 of the first antenna element and the second sub-unit 684 of the second antenna element with a plurality of phase shifters 665-1 and 667-1 and a plurality of amplifiers 675-1 and 677-1 corresponding to an uplink or through a plurality of phase shifters 665-2 and 667-2 and a plurality of low-noise amplifiers 675-2 and 677-2 corresponding to a downlink.

According to various embodiments, the plurality of phase shifters 665-1 and 667-1 may shift the phase of the signal of the third frequency output from the third divider 649, and the plurality of amplifiers 675-1 and 677-1 may amplify the signals output from the plurality of phase shifters 665-1 and 667-1, respectively, and transfer the amplified signals to the second sub-unit 683 of the first antenna element and the second sub-unit 684 of the second antenna element. The second sub-unit 683 of the first antenna element and the second sub-unit 684 of the second antenna element, respectively, may generate and transmit RF signals having the second polarization characteristic and the third frequency based on the signals output from the plurality of amplifiers 675-1 and 677-1 and transmitted through the plurality of switches 655-2 and 657-2.

According to various embodiments, the second IF component of the second IF signal, transferred through the port 612, may be input to the fourth mixer 641, and the frequency of the second IF component may be converted into a fourth frequency of an mmWave band by the fourth mixer 641 and the local oscillator 635. According to various embodiments, the fourth frequency may be 39 GHz.

According to various embodiments, the signal of the fourth frequency output from the fourth mixer 641 may be transferred to the plurality of switches 656-1 and 658-1 by the fourth divider 642. The plurality of switches 656-1, 656-2, 658-1, and 658-2, respectively, may connect the fourth divider 642 and the second sub-unit 683 of the first antenna element and the second sub-unit 684 of the second antenna element with a plurality of phase shifters 666-1 and 668-1 and a plurality of amplifiers 676-1 and 678-1 corresponding to an uplink or through a plurality of phase shifters 666-2 and 668-2 and a plurality of low-noise amplifiers 676-2 and 678-2 corresponding to a downlink.

According to various embodiments, the plurality of phase shifters 666-1 and 668-1 may shift the phase of the signal of the fourth frequency output from the fourth divider 642, and the plurality of amplifiers 676-1 and 678-1 may amplify the signals output from the plurality of phase shifters 666-1 and 668-1, respectively, and transfer the amplified signals to the second sub-unit 683 of the first antenna element and the second sub-unit 684 of the second antenna element. The second sub-unit 683 of the first antenna element and the second sub-unit 684 of the second antenna element, respectively, may generate and transmit RF signals having the second polarization characteristic and the fourth frequency based on the signals output from the plurality of amplifiers 676-1 and 678-1 and transmitted through the plurality of switches 656-2 and 658-2.

According to various embodiments, referring back to FIG. 6A, in the downlink situation, the first sub-unit 681 of the first antenna element and the first sub-unit 682 of the second antenna element may receive an RF signal of the third frequency having the first polarization characteristic and an RF signal of the fourth frequency having the first polarization characteristic. As described above, in the downlink situation, the plurality of switches 651-1, 651-2, 653-1, and 653-2, respectively, may connect the first divider 633 and the first sub-unit 681 of the first antenna element and the first sub-unit 682 of the second antenna element with the plurality of phase shifters 661-2 and 663-2 and the plurality of low-noise amplifiers 671-2 and 673-2, and the plurality of switches 652-1, 652-2, 654-1, and 654-2, respectively, may connect the second divider 636 and the first sub-unit 681 of the first antenna element and the first sub-unit 682 of the second antenna element with the plurality of phase shifters 662-2 and 664-2 and the plurality of low-noise amplifiers 672-2 and 674-2.

The RF signal of the third frequency received by the first sub-unit 681 of the first antenna element may be transmitted through the switch 651-1, be amplified by the low-noise amplifier 671-2, be phase-shifted by the phase shifter 661-2, and be then input to the first divider 633. The RF signal of the third frequency received by the first sub-unit 682 of the first antenna element may be transmitted through the switch 653-2, be amplified by the low-noise amplifier 673-2, be phase-shifted by the phase shifter 663-2, and be then input to the first divider 633. The two signals input to the first divider 633 may be frequency-converted into a first frequency (e.g., 8 GHz) of an intermediate band by the first mixer 631 and be input to the first diplexer 621.

The RF signal of the fourth frequency received by the first sub-unit 681 of the first antenna element may be transmitted through the switch 652-2, be amplified by the low-noise amplifier 672-2, be phase-shifted by the phase shifter 662-2, and be then input to the second divider 636. The RF signal of the fourth frequency received by the first sub-unit 682 of the second antenna element may be transmitted through the switch 654-2, be amplified by the low-noise amplifier 674-2, be phase-shifted by the phase shifter 664-2, and be then input to the second divider 636. The two signals input to the second divider 636 may be frequency-converted into a second frequency (e.g., 10.5 GHz) of an intermediate band by the second mixer 634 and be input to the first diplexer 621.

The first diplexer 621 may synthesize an input signal having the first frequency and an input signal having the second frequency and transfer the synthesized signal, as the first IF signal corresponding to the first polarization characteristic, to the IFIC 610 through the port 611. The IFIC 610 may convert the first IF signal into a baseband signal and transfer it to the communication processor.

Referring back to FIG. 6A, in the downlink situation, the second sub-unit 683 of the first antenna element and the second sub-unit 684 of the second antenna element may receive the RF signal of the third frequency having the second polarization characteristic and the RF signal of the fourth frequency having the second polarization characteristic. As described above, in the downlink situation, the plurality of switches 655-1, 655-2, 657-1, and 657-2, respectively, may connect the third divider 649 and the second sub-unit 683 of the first antenna element and the second sub-unit 684 of the second antenna element with the plurality of phase shifters 665-2 and 667-2 and the plurality of low-noise amplifiers 675-2 and 677-2, and the plurality of switches 656-1, 656-2, 658-1, and 658-2, respectively, may connect the fourth divider 642 and the second sub-unit 683 of the first antenna element and the second sub-unit 684 of the second antenna element with the plurality of phase shifters 666-2 and 668-2 and the plurality of low-noise amplifiers 676-2 and 678-2.

The RF signal of the third frequency received by the second sub-unit 683 of the first antenna element may be transmitted through the switch 655-2, be amplified by the low-noise amplifier 675-2, be phase-shifted by the phase shifter 665-2, and be then input to the third divider 649. The RF signal of the third frequency received by the second sub-unit 684 of the second antenna element may be transmitted through the switch 657-2, be amplified by the low-noise amplifier 677-2, be phase-shifted by the phase shifter 667-2, and be then input to the third divider 649. The two signals input to the third divider 649 may be frequency-converted into a first frequency (e.g., 8 GHz) of an intermediate band by the third mixer 637 and be input to the second diplexer 622.

The RF signal of the fourth frequency received by the second sub-unit 683 of the first antenna element may be transmitted through the switch 656-2, be amplified by the low-noise amplifier 676-2, be phase-shifted by the phase shifter 666-2, and be then input to the fourth divider 642. The RF signal of the fourth frequency received by the second sub-unit 684 of the second antenna element may be transmitted through the switch 658-2, be amplified by the low-noise amplifier 678-2, be phase-shifted by the phase shifter 668-2, and be then input to the fourth divider 642. The two signals input to the fourth divider 642 may be frequency-converted into a second frequency (e.g., 10.5 GHz) of an intermediate band by the fourth mixer 641 and be input to the second diplexer 622.

The second diplexer 622 may synthesize an input signal having the first frequency and an input signal having the second frequency and transfer the synthesized signal, as the second IF signal corresponding to the second polarization characteristic, to the IFIC 610 through the port 612. The IFIC 610 may convert the second IF signal into a baseband signal and transfer it to the communication processor.

Figure 7:
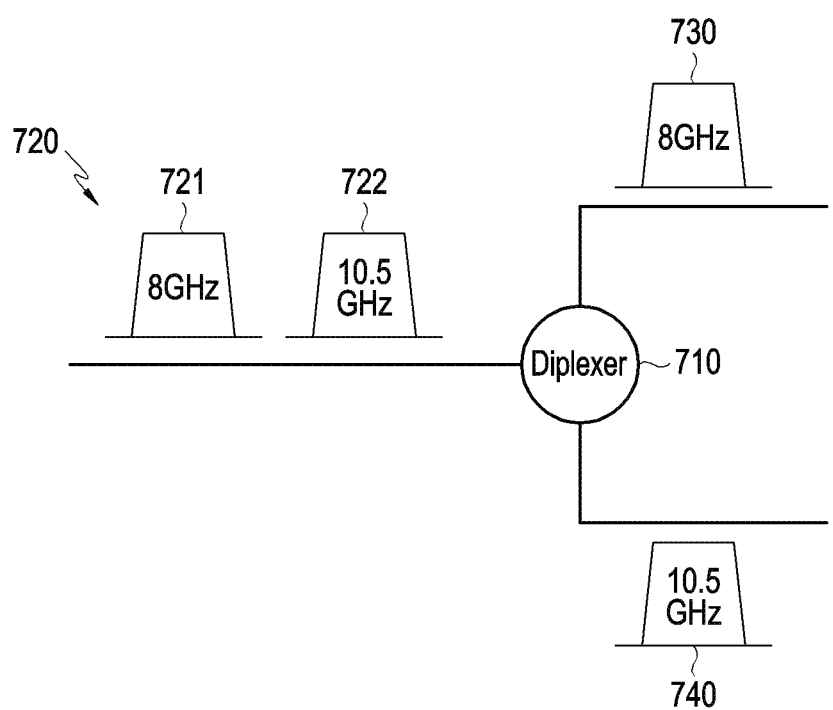
FIG. 7 illustrates an input and outputs of a diplexer according to various embodiments.

FIG. 7 illustrates an input and outputs of a diplexer according to various embodiments.

Referring to FIG. 7, the diplexer 710 of FIG. 7 may be the plurality of diplexers 561 and 562 of FIG. 5, the first diplexer 621 of FIG. 6A, or the second diplexer 622 of FIG. 6B. According to various embodiments, the diplexer 710 may include a low-pass filter and a high-pass filter. An input signal 720 input to the diplexer 710 may include a first component 721 having a first frequency (e.g., 8 GHz) and a second component 722 having a second frequency (e.g., 10.5 GHz). In this case, a signal 730 output from a first output terminal of two output terminals of the diplexer 710 may include only the first frequency component that has passed through the low-pass filter. A signal 740 output from a second output terminal of the two output terminals of the diplexer 710 may include only the second frequency component that has passed through the high-pass filter. Although FIG. 7 illustrates an example in which the input signal includes an 8 GHz component and a 10.5 GHz component, and the diplexer 710 is configured to separate the 8 GHz component and 10.5 GHz component, the show frequency values are merely examples, and the diplexer 710 may be designed to separate a variety of different frequency components.

Figure 8A:
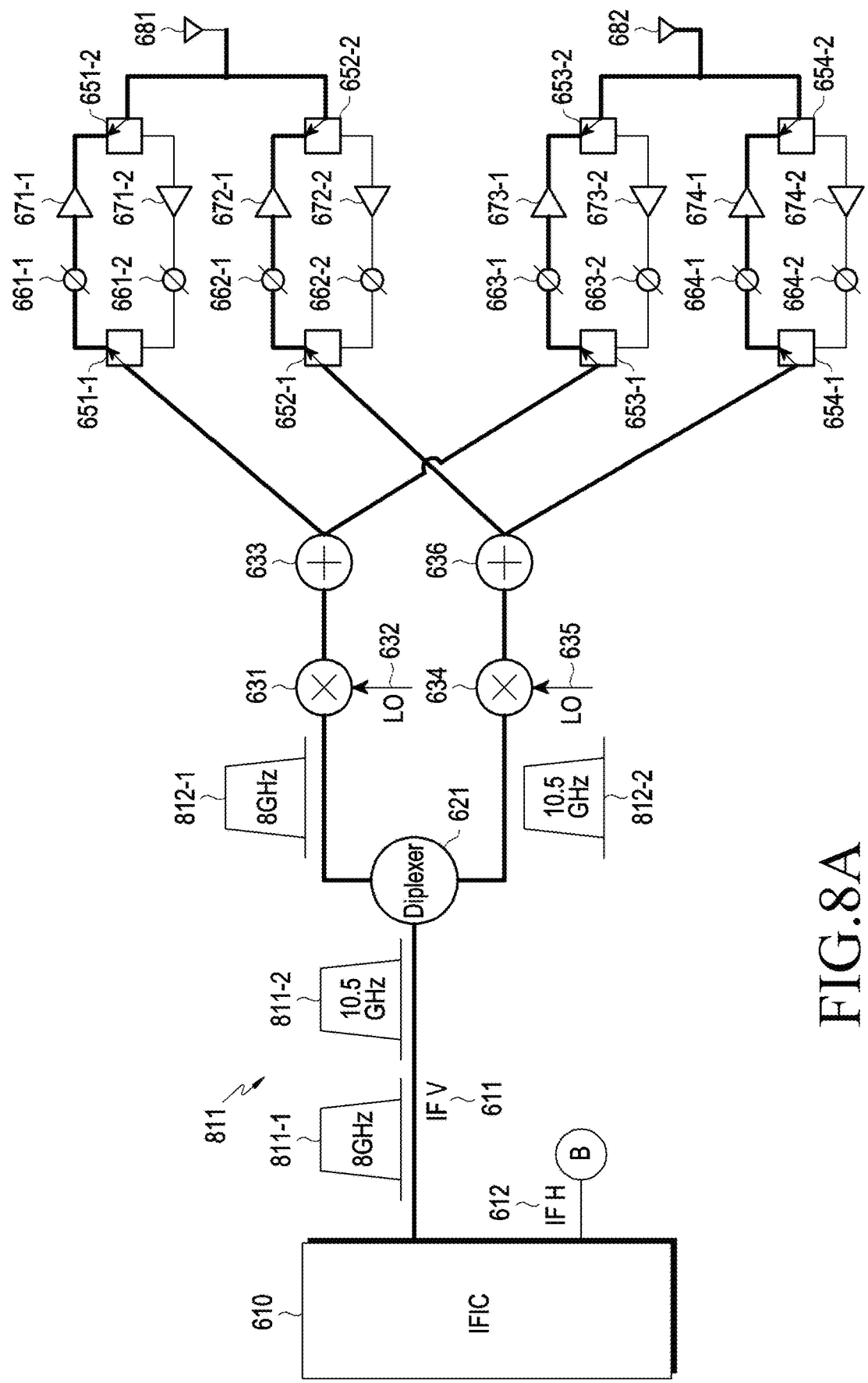
FIGS. 8A and 8B illustrate signals transferred from an antenna module according to various embodiments.
Figure 8B:
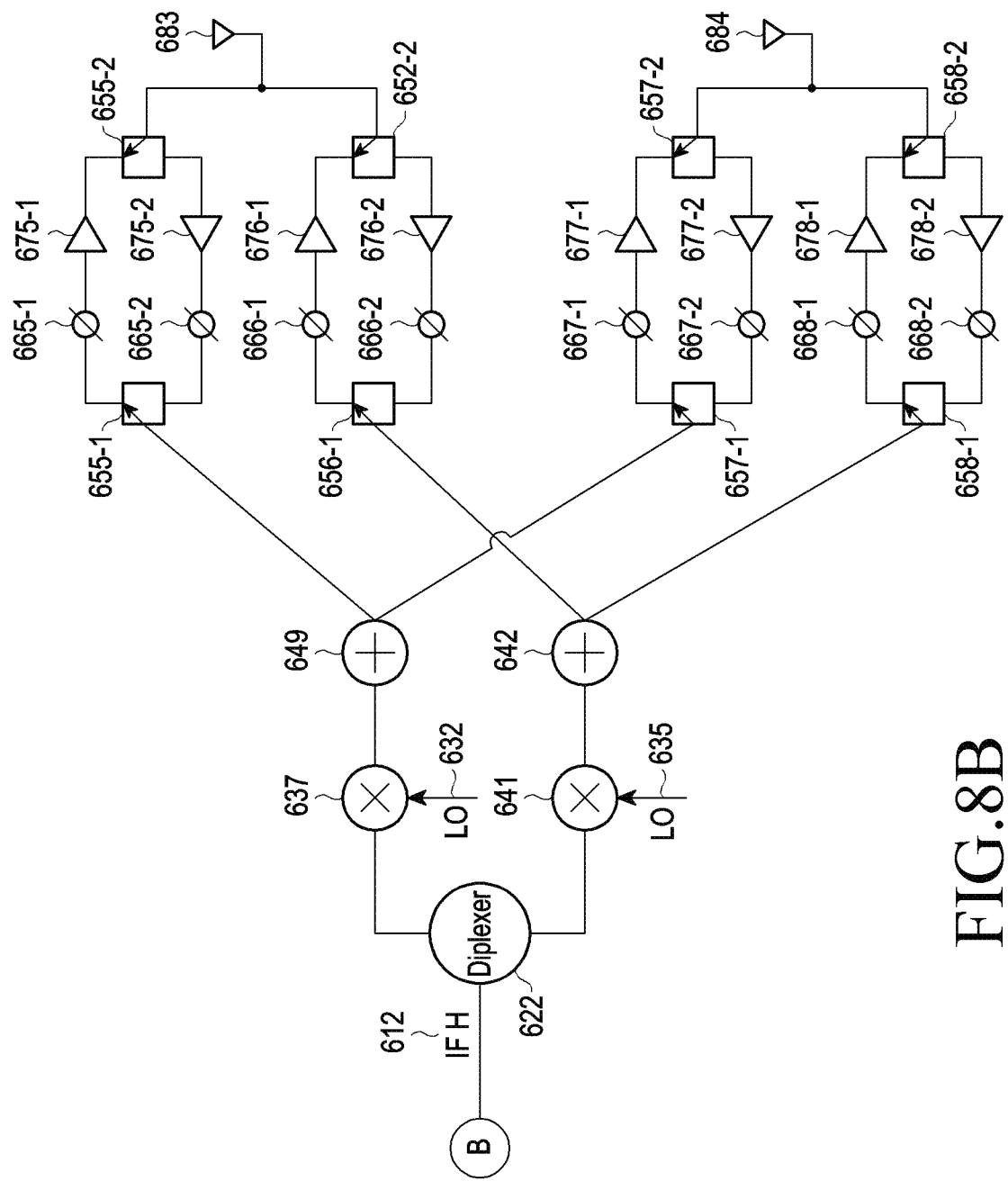

FIGS. 8A and 8B illustrate signals transferred from an antenna module according to various embodiments. Specifically, FIGS. 8A and 8B illustrate a situation in which an antenna module supports inter-band CA of rank 1. In FIGS. 8A and 8B, the hardware configuration of the antenna module is the same as that described above with reference to FIGS. 6A and 6B, and thus, no duplicate description thereof is given below.

Referring to FIG. 8A, an antenna module may receive a first IF signal 811 corresponding to a first polarization characteristic through a port 611. The first IF signal 811 may include a first IF component 811-1 having a frequency of 8 GHz and a second IF component 811-2 having a frequency of 10.5 GHz. The first diplexer 621 may separate the first IF signal 811 into the first IF component 811-1 and the second IF component 811-2 and may output (812-1) the first IF component 811-1 of the first IF signal 811 through a first output terminal and output (812-2) the second IF component 811-2 of the first IF signal 811 through a second output terminal.

As described above with reference to FIGS. 6A and 6B, the first sub-unit 681 of the first antenna element and the first sub-unit 682 of the second antenna element may generate and transmit an RF signal having a first polarization state and a third frequency (e.g., 24 GHz or 28 GHz) based on the output 812-1. Further, the first sub-unit 681 of the first antenna element and the first sub-unit 682 of the second antenna element may generate and transmit an RF signal having the first polarization state and a fourth frequency (e.g., 39 GHz) based on the output 812-2.

Referring to FIG. 8B, the antenna module (e.g., the antenna modules 242, 244, and/or 246 of FIG. 2A) may receive no signal from the IFIC 610 through the port 612. As described above with reference to FIGS. 6A and 6B, in this case, the second sub-unit 683 of the first antenna element and the second sub-unit 684 of the second antenna element may refrain from generating and transmitting an RF signal.

In sum, in the situation of FIGS. 8A and 8B, the antenna module may communicate with a primary cell (P-cell) using the RF signal having the first polarization state and the third frequency (e.g., 24 GHz or 28 GHz) and may communicate with a secondary cell (S-cell) using the RF signal having the first polarization state and the fourth frequency (e.g., 39 GHz).

Figure 9A:
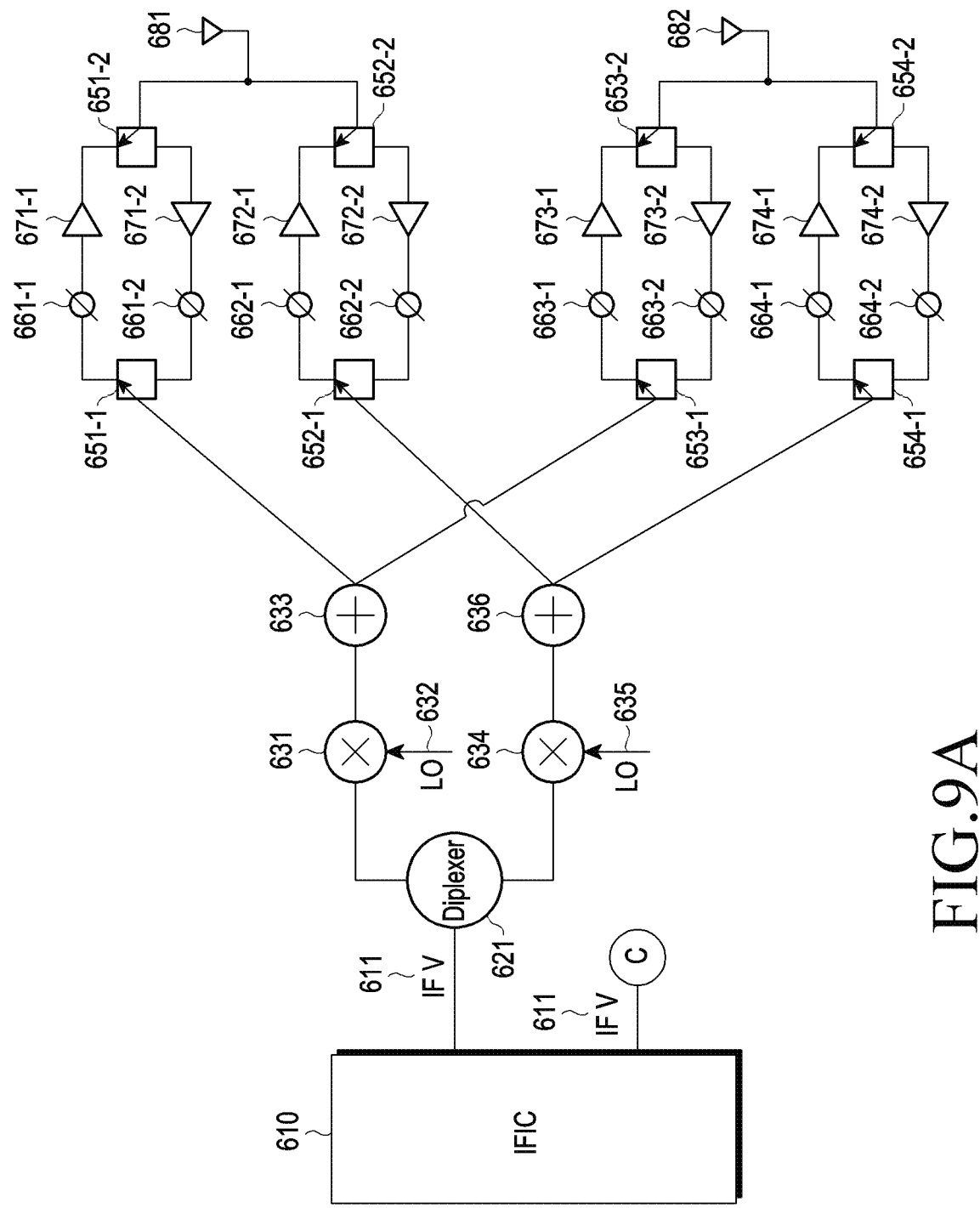
FIGS. 9A and 9B illustrate signals transferred from an antenna module according to various embodiments.
Figure 9B:
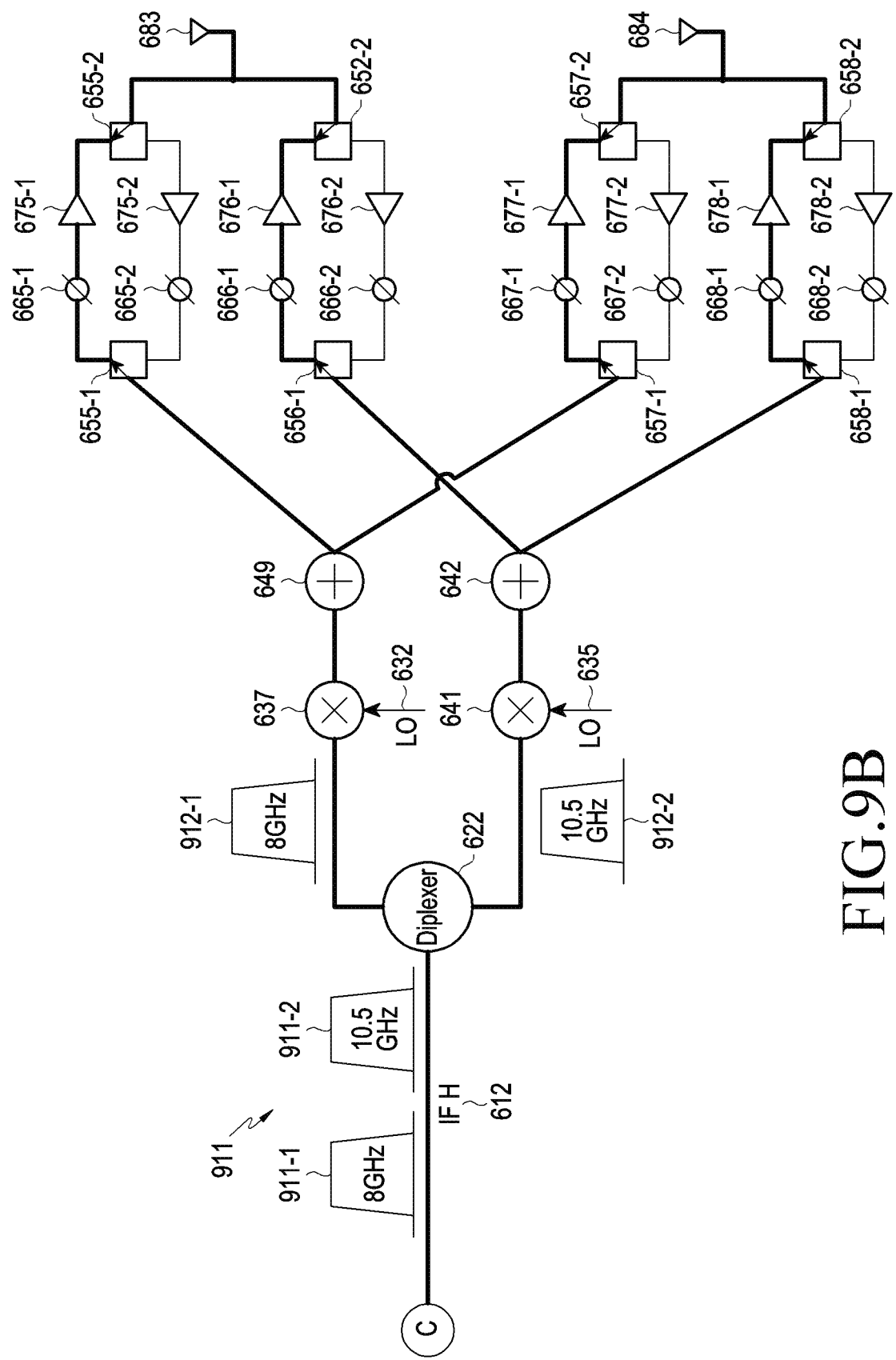

FIGS. 9A and 9B illustrate signals transferred from an antenna module according to various embodiments. Specifically, FIGS. 9A and 9B illustrate a situation in which an antenna module supports inter-band CA of rank 1. In FIGS. 9A and 9B, the hardware configuration of the antenna module is the same as that described above with reference to FIGS. 6A and 6B, and thus, no duplicate description thereof is given below.

Referring to FIG. 9A, the antenna module may receive no signal from the IFIC 610 through the port 611. As described above with reference to FIGS. 6A and 6B, in this case, the first sub-unit 681 of the first antenna element and the first sub-unit 682 of the second antenna element may refrain from generating and transmitting an RF signal.

Referring to FIG. 9B, the antenna module may receive a second IF signal 911 corresponding to a second polarization characteristic through the port 612. The second IF signal 911 may include a first IF component 911-1 having a frequency of 8 GHz and a second IF component 911-2 having a frequency of 10.5 GHz. The second diplexer 622 may separate the second IF signal 911 into the first IF component 911-1 and the second IF component 911-2 and may output (912-1) the first IF component 911-1 of the second IF signal 911 through a first output terminal and output (912-2) the second IF component 911-2 of the second IF signal 911 through a second output terminal.

As described above with reference to FIGS. 6A and 6B, the second sub-unit 683 of the first antenna element and the second sub-unit 684 of the second antenna element may generate and transmit an RF signal having a second polarization state and a third frequency (e.g., 24 GHz or 28 GHz) based on the output 912-1. Further, the second sub-unit 683 of the first antenna element and the second sub-unit 684 of the second antenna element may generate and transmit an RF signal having the second polarization state and a fourth frequency (e.g., 39 GHz) based on the output 912-2.

According to various embodiments, in the situation of FIGS. 9A and 9B, the antenna module may communicate with a primary cell (P-cell) using the RF signal having the second polarization state and the third frequency (e.g., 24 GHz or 28 GHz) and may communicate with a secondary cell (S-cell) using the RF signal having the second polarization state and the fourth frequency (e.g., 39 GHz).

Figure 10A:
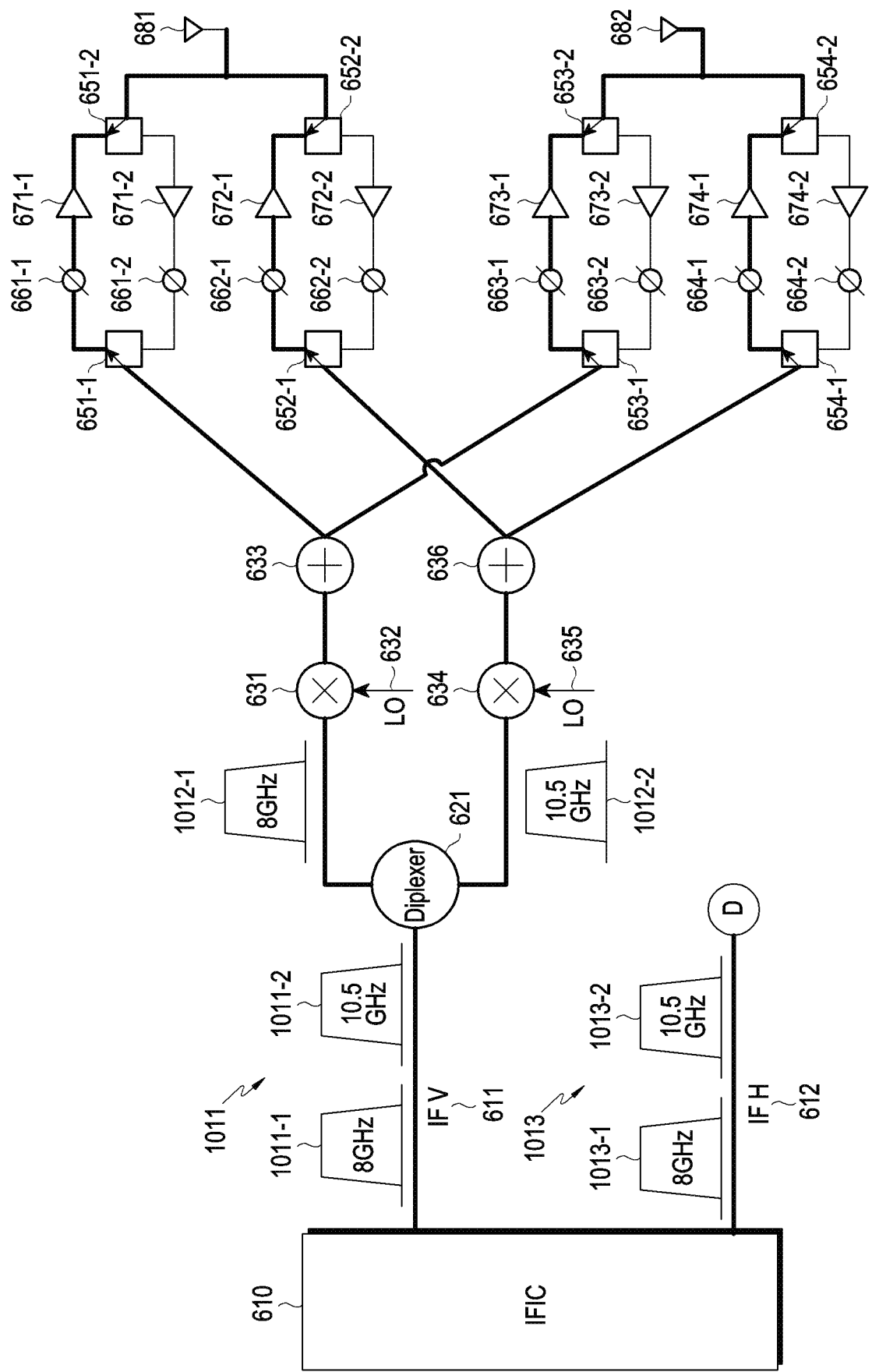
FIGS. 10A and 10B illustrate signals transferred from an antenna module according to various embodiments.
Figure 10B:
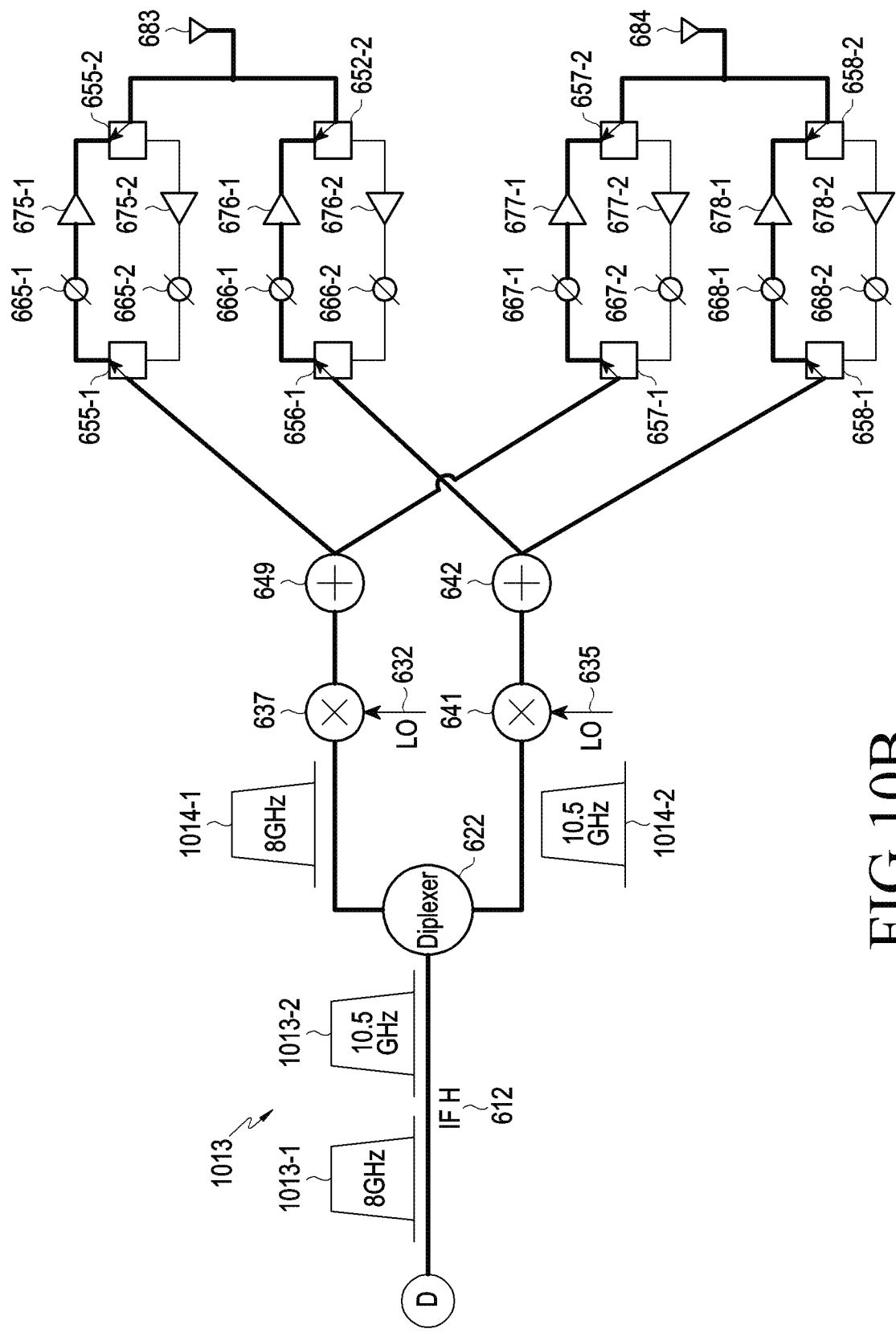

FIGS. 10A and 10B illustrate signals transferred from an antenna module according to various embodiments. Specifically, FIGS. 10A and 10B illustrate a situation in which an antenna module supports inter-band CA of rank 2. In FIGS. 10A and 10B, the hardware configuration of the antenna module is the same as that described above with reference to FIGS. 6A and 6B, and thus, no duplicate description thereof is given below.

Referring to FIG. 10A, an antenna module may receive a first IF signal 1011 corresponding to a first polarization characteristic through a port 611. The first IF signal 1011 may include a first IF component 1011-1 having a frequency of 8 GHz and a second IF component 1011-2 having a frequency of 10.5 GHz. The first diplexer 621 may separate the first IF signal 1011 into the first IF component 1011-1 and the second IF component 1011-2 and may output (1012-1) the first IF component 1011-1 of the first IF signal 1011 through a first output terminal and output (1012-2) the second IF component 1011-2 of the first IF signal 1011 through a second output terminal.

As described above with reference to FIGS. 6A and 6B, the first sub-unit 681 of the first antenna element and the second sub-unit 684 of the second antenna element may generate and transmit an RF signal having a first polarization state and a third frequency (e.g., 24 GHz or 28 GHz) based on the output 1012-1. Further, the first sub-unit 681 of the first antenna element and the second sub-unit 684 of the second antenna element may generate and transmit an RF signal having the first polarization state and a fourth frequency (e.g., 39 GHz) based on the output 1012-2.

Referring to FIG. 10B, the antenna module may receive a second IF signal 1013 corresponding to a second polarization characteristic through the port 612. The second IF signal 1013 may include a first IF component 1013-1 having a frequency of 8 GHz and a second IF component 1013-2 having a frequency of 10.5 GHz. The second diplexer 622 may separate the second IF signal 1013 into the first IF component 1013-1 and the second IF component 1013-2 and may output (1014-1) the first IF component 1013-1 of the second IF signal 1013 through a first output terminal and output (1014-2) the second IF component 1013-2 of the second IF signal 1013 through a second output terminal.

As described above with reference to FIGS. 6A and 6B, the second sub-unit 683 of the first antenna element and the second sub-unit 684 of the second antenna element may generate and transmit an RF signal having a second polarization state and a third frequency (e.g., 24 GHz or 28 GHz) based on the output 1014-1. Further, the second sub-unit 683 of the first antenna element and the second sub-unit 684 of the second antenna element may generate and transmit an RF signal having the second polarization state and a fourth frequency (e.g., 39 GHz) based on the output 1014-2.

According to various embodiments, in the situation of FIGS. 10A and 10B, the antenna module may communicate with the primary cell (P-cell) using the RF signal having the first polarization state and the third frequency (e.g., 24 GHz or 28 GHz) and the RF signal having the second polarization state and the third frequency (e.g., 24 GHz or 28 GHz) and may communicate with the secondary cell (S-cell) using the RF signal having the first polarization state and the fourth frequency (e.g., 39 GHz) and the RF signal having the second polarization state and the fourth frequency (e.g., 39 GHz).

According to various embodiment, an electronic device may comprise at least one communication processor, an intermediate frequency integrated circuit (IFIC) configured to output at least one of a first intermediate frequency (IF) signal corresponding to a first polarization characteristic or a second IF signal corresponding to a second polarization characteristic, based on a baseband signal generated from the at least one communication processor, a radio frequency integrated circuit (RFIC) configured to control at least one antenna element to generate a radio frequency (RF) signal, based on at least one of the first IF signal or the second IF signal, and an antenna array including at least one antenna element configured to generate and transmit the RF signal. The RFIC may include a first diplexer configured to receive the first IF signal and a second diplexer configured to receive the second IF signal. Each of the first IF signal and the second IF signal may include a first IF component and a second IF component. The first diplexer is configured to separate the first IF component and the second IF component included in the first IF signal, and the second diplexer are configured to separate the first IF component and the second IF component included in the second IF signal.

According to various embodiments, the RFIC may be configured to control the at least one antenna element to generate an RF signal of a first frequency having the first polarization characteristic, based on the first IF component of the first IF signal, output from the first diplexer, control the at least one antenna element to generate an RF signal of a second frequency having the first polarization characteristic, based on the second IF component of the first IF signal, output from the first diplexer, control the at least one antenna element to generate an RF signal of the first frequency having the second polarization characteristic, based on the first IF component of the second IF signal, output from the second diplexer, and control the at least one antenna element to generate an RF signal of the second frequency having the first polarization characteristic, based on the second IF component of the first IF signal, output from the first diplexer.

According to various embodiments, the electronic device may be configured to communicate with a P-cell using the RF signal of the first frequency having the first polarization characteristic and communicate an S-cell using the RF signal of the second frequency having the first polarization characteristic.

According to various embodiments, the electronic device may be configured to communicate with a P-cell using the RF signal of the first frequency having the second polarization characteristic and communicate an S-cell using the RF signal of the second frequency having the second polarization characteristic.

According to various embodiments, the electronic device may be configured to communicate with a P-cell using the RF signal of the first frequency having the first polarization characteristic and the RF signal of the first frequency having the second polarization characteristic and communicate with an S-cell using the RF signal of the second frequency having the first polarization characteristic and the RF signal of the second frequency having the second polarization characteristic.

According to various embodiments, each of the at least one antenna element may include a first sub-unit configured to generate and transmit an RF signal having the first polarization characteristic and a second sub-unit configured to generate and transmit an RF signal having the second polarization characteristic.

According to various embodiments, the RFIC may include a first mixer connected to a first output terminal of the first diplexer and configured to convert a frequency of the first IF component of the first IF signal, a second mixer connected to a second output terminal of the first diplexer and configured to convert a frequency of the second IF component of the first IF signal, a third mixer connected to a first output terminal of the second diplexer and configured to convert a frequency of the first IF component of the second IF signal, and a fourth mixer connected to a second output terminal of the second diplexer and configured to convert a frequency of the second IF component of the second IF signal.

According to various embodiments, the IFIC may include a first bandpass filter configured to pass a second baseband signal having a third frequency among first baseband signals corresponding to the first polarization characteristic and generated from the at least one communication processor, a second bandpass filter configured to pass a third baseband signal having a fourth frequency among the first baseband signals, a fifth mixer configured to convert a frequency of the second baseband signal to a frequency corresponding to the first IF component, a sixth mixer configured to convert a frequency of the third baseband signal to a frequency corresponding to the second IF component, a third diplexer configured to synthesize a signal output from the first mixer and a signal output from the second mixer and output the first IF signal, a third bandpass filter configured to pass a fifth baseband signal having the third frequency among fourth baseband signals corresponding to the second polarization characteristic and generated from the at least one communication processor, a fourth bandpass filter configured to pass a sixth baseband signal having the fourth frequency among the fourth baseband signals, a seventh mixer configured to convert a frequency of the fifth baseband signal to a frequency corresponding to the first IF component, an eighth mixer configured to convert a frequency of the sixth baseband signal to a frequency corresponding to the second IF component, and a fourth diplexer configured to synthesize a signal output from the third mixer and a signal output from the fourth mixer and output the second IF signal.

According to various embodiments, the first IF component may have a frequency of 8 GHz, and the second IF component may have a frequency of 10.5 GHz.

According to various embodiments, the first frequency may be 24 GHz or 28 GHz, and the second frequency may be 39 GHz.

According to various embodiments, an antenna module may comprise a first port configured to receive a first IF signal corresponding to a first polarization characteristic, from an intermediate frequency integrated circuit (IFIC) outputting an intermediate frequency (IF) signal based on a baseband signal, a second port configured to receive a second IF signal corresponding to a second polarization characteristic from the IFIC, a first diplexer connected with the first port and configured to separate a first IF component and a second IF component of the first IF signal, and a second diplexer connected with the second port and configured to separate a first IF component and a second IF component of the second IF signal.

According to various embodiments, the antenna module may further comprise an antenna array including at least one antenna element configured to generate an RF signal of a first frequency having the first polarization characteristic, based on the first IF component of the first IF signal, generate an RF signal of a second frequency having the first polarization characteristic, based on the second IF component of the first IF signal, generate an RF signal of the first frequency having the second polarization characteristic, based on the first IF component of the second IF signal, and generate an RF signal of the second frequency having the second polarization characteristic, based on the second IF component of the second IF signal.

According to various embodiments, the antenna module may be configured to communicate with a P-cell using the RF signal of the first frequency having the first polarization characteristic and communicate an S-cell using the RF signal of the second frequency having the first polarization characteristic.

According to various embodiments, the antenna module may be configured to communicate with a P-cell using the RF signal of the first frequency having the second polarization characteristic and communicate an S-cell using the RF signal of the second frequency having the second polarization characteristic.

According to various embodiments, the antenna module may be configured to communicate with a P-cell using the RF signal of the first frequency having the first polarization characteristic and the RF signal of the first frequency having the second polarization characteristic and communicate with an S-cell using the RF signal of the second frequency having the first polarization characteristic and the RF signal of the second frequency having the second polarization characteristic.

According to various embodiments, the antenna module may include at least one antenna element. Each of the at least one antenna element may include a first sub-unit for generating and transmitting an RF signal having the first polarization characteristic and a second sub-unit for generating and transmitting an RF signal having the second polarization characteristic.

According to various embodiments, the antenna module may further comprise a first mixer connected to a first output terminal of the first diplexer and configured to convert a frequency of the first IF component of the first IF signal, a second mixer connected to a second output terminal of the first diplexer and configured to a frequency of the second IF component of the first IF signal, a third mixer connected to a first output terminal of the second diplexer and configured to convert a frequency of the first IF component of the second IF signal, and a fourth mixer connected to a second output terminal of the second diplexer and configured to a frequency of the second IF component of the second IF signal.

According to various embodiments, the first IF component may have a frequency of 8 GHz, and the second IF component may have a frequency of 10.5 GHz.

According to various embodiments, the first frequency may be 24 GHz or 28 GHz, and the second frequency may be 39 GHz.

According to various embodiments, an antenna module may comprise an antenna array including at least one antenna element each including a first sub-unit configured to receive an RF signal having a first polarization characteristic and a second sub-unit configured to receive an RF signal having a second polarization characteristic, a first mixer converting an RF signal of a first frequency, among RF signals having the first polarization characteristic received through the first sub-unit, into a first intermediate frequency (IF) signal, a second mixer converting an RF signal of a second frequency, among RF signals having the first polarization characteristic received through the first sub-unit, into a second IF signal, a first diplexer configured to synthesize and output the first IF signal output from the first mixer and the second IF signal output from the second mixer, a third mixer converting an RF signal of the first frequency, among RF signals having the second polarization characteristic received through the second sub-unit, into a third intermediate frequency (IF) signal, a fourth mixer converting an RF signal of the second frequency, among the RF signals having the second polarization characteristic received through the second sub-unit, into a fourth IF signal, and a second diplexer configured to synthesize and output the third IF signal output from the third mixer and the fourth IF signal output from the fourth mixer.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to various embodiments, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to various embodiments, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to various embodiments, a method according to various embodiments may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
   at least one communication processor;
   an intermediate frequency integrated circuit (IFIC) including a first diplexer and a second diplexer,
   wherein the first diplexer is configured to output, based on a baseband signal generated from the at least one communication processor, a first intermediate frequency (IF) signal including a first IF component and a second IF component which have a first polarization characteristic, the first IF component having a first frequency, the second IF component having a second frequency,
   wherein the second diplexer is configured to output, based on a baseband signal generated from the at least one communication processor, a second IF signal including a third IF component and a fourth IF component which have a second polarization characteristic, the third IF component having the first frequency, the fourth IF component having the second frequency;
   a radio frequency integrated circuit (RFIC) configured to control at least one antenna element to generate a radio frequency (RF) signal, based on at least one of the first IF signal or the second IF signal; and
   an antenna array including a first antenna element and a second antenna element,
   wherein each of the first antenna element and the second antenna element includes a first sub-unit configured to generate and transmit a RF signal having the first polarization characteristic and a second sub-unit configured to generate and transmit a RF signal having the second polarization characteristic,
   wherein the RFIC includes a third diplexer configured to receive the first IF signal from the first diplexer and a fourth diplexer configured to receive the second IF signal from the second diplexer,
   wherein the third diplexer is configured to separate the first IF signal received from the first diplexer into the first IF component and the second IF component which have the first polarization characteristic,
   wherein the fourth diplexer is configured to separate the second IF signal received from the second diplexer into the third IF component and the fourth IF component which have second first polarization characteristic, and
   wherein the RFIC is configured to:
   provide a first signal having the first polarization characteristic and generated based on the first IF component of the first IF signal to the first sub-unit of the first antenna element and the first sub-unit of the second antenna element,
   provide a second signal having the first polarization characteristic and generated based on the second IF component of the first IF signal to the first sub-unit of the first antenna element and the first sub-unit of the second antenna element,
   provide a third signal having second polarization characteristic and generated based on the third IF component of the second IF signal to the second sub-unit of the first antenna element and the second sub-unit of the second antenna element, and
   provide a fourth signal having second polarization characteristic and generated based on the fourth IF component of the second IF signal to the second sub-unit of the first antenna element and the second sub-unit of the second antenna element.

2. The electronic device of claim 1, wherein the RFIC is configured to:
control at least one of the first sub-unit of the first antenna element or the first sub-unit of the second antenna element to generate a radio frequency (RF) signal of a third frequency having the first polarization characteristic, based on the first signal,
control at least one of the first sub-unit of the first antenna element or the first sub-unit of the second antenna element to generate a RF signal of a fourth frequency having the first polarization characteristic, based on the second signal,
control at least one of the second sub-unit of the first antenna element or the second sub-unit of the second antenna element to generate a RF signal of the third frequency having the second polarization characteristic, based on the third signal, and
control at least one of the second sub-unit of the first antenna element or the second sub-unit of the second antenna element to generate a RF signal of the fourth frequency having the second polarization characteristic, based on the fourth signal.

3. The electronic device of claim 2, wherein the electronic device is configured to:
communicate with a P-cell using the RF signal of the third frequency having the first polarization characteristic, and
communicate an S-cell using the RF signal of the fourth frequency having the first polarization characteristic.

4. The electronic device of claim 2, wherein the electronic device is configured to:
communicate with a P-cell using the RF signal of the third frequency having the second polarization characteristic, and
communicate an S-cell using the RF signal of the fourth frequency having the second polarization characteristic.

5. The electronic device of claim 2, wherein the electronic device is configured to:
communicate with a P-cell using the RF signal of the third frequency having the first polarization characteristic and the RF signal of the third frequency having the second polarization characteristic, and
communicate with an S-cell using the RF signal of the fourth frequency having the first polarization characteristic and the RF signal of the fourth frequency having the second polarization characteristic.

6. The electronic device of claim 1, wherein the RFIC includes:
a first mixer connected to a first output terminal of the third diplexer and configured to convert the first frequency of the first IF component of the first IF signal;
a second mixer connected to a second output terminal of the third diplexer and configured to convert the second frequency of the second IF component of the first IF signal;
a third mixer connected to a first output terminal of the fourth diplexer and configured to convert the first frequency of the third IF component of the second IF signal; and
a fourth mixer connected to a second output terminal of the fourth diplexer and configured to convert the second frequency of the fourth IF component of the second IF signal.

7. The electronic device of claim 6, wherein the IFIC includes:
a first bandpass filter configured to pass a second baseband signal having a third frequency among first baseband signal corresponding to the first polarization characteristic and generated from the at least one communication processor;
a second bandpass filter configured to pass a third baseband signal having a fourth frequency among the first baseband signal;
a fifth mixer configured to convert a frequency of the second baseband signal to the first frequency corresponding to the first IF component;
a sixth mixer configured to convert a frequency of the third baseband signal to the second frequency corresponding to the second IF component;
the first diplexer configured to synthesize a signal output from the first mixer and a signal output from the second mixer and output the first IF signal;
a third bandpass filter configured to pass a fifth baseband signal having the third frequency among fourth baseband signal corresponding to the second polarization characteristic and generated from the at least one communication processor;
a fourth bandpass filter configured to pass a sixth baseband signal having the fourth frequency among the fourth baseband signal;
a seventh mixer configured to convert a frequency of the fifth baseband signal to the first frequency corresponding to the third IF component;
an eighth mixer configured to convert a frequency of the sixth baseband signal to the second frequency corresponding to the fourth IF component; and
the second diplexer configured to synthesize a signal output from the third mixer and a signal output from the fourth mixer and output the second IF signal.

8. The electronic device of claim 1, wherein the first frequency is 8 GHZ, and the second frequency is 10.5 GHz.

9. The electronic device of claim 2, wherein the third frequency is 24 GHz or 28 GHZ, and the fourth frequency is 39 GHz.

10. An antenna module comprising:
a first port configured to receive a first IF signal corresponding to a first polarization characteristic, from an intermediate frequency integrated circuit (IFIC) outputting an intermediate frequency (IF) signal based on a baseband signal;
a second port configured to receive a second IF signal corresponding to a second polarization characteristic from the IFIC, the IFIC including a first diplexer and a second diplexer, wherein the first diplexer is configured to output, based on the baseband signal generated from at least one communication processor, the first IF signal including a first IF component and a second IF component which have the first polarization characteristic, the first IF component having a first frequency, the second IF component having a second frequency, wherein the second diplexer is configured to output, based on the baseband signal generated from the at least one communication processor, the second IF signal including a third IF component and a fourth IF component which have the second polarization characteristic, the third IF component having the first frequency, the fourth IF component having the second frequency;
a third diplexer connected with the first port and configured to separate the first IF signal received from the first diplexer into the first IF component and the second IF component which have the first polarization characteristic second IF component of the first IF signal having the first polarization characteristic;

a fourth_diplexer connected with the second port and configured to separate the second IF signal received from the second diplexer into the third IF component and the fourth IF component which have second first polarization characteristic; and an antenna array including a first antenna element and a second antenna element, wherein each of the first antenna element and the second antenna element includes a first sub-unit configured to generate and transmit a RF signal having the first polarization characteristic and a second sub-unit configured to generate and transmit a RF signal having the second polarization characteristic, wherein the first sub-unit of the first antenna element and the first sub-unit of the second antenna element is configured to receive a first signal having the first polarization characteristic and generated based on the first IF component of the first IF signal, wherein the first sub-unit of the first antenna element and the first sub-unit of the second antenna element is configured to receive a second signal having the first polarization characteristic and generated based on the second IF component of the first IF signal, wherein the second sub-unit of the first antenna element and the second sub-unit of the second antenna element is configured to receive a third signal having the second polarization characteristic and generated based on the third IF component of the second IF signal, and wherein the second sub-unit of the first antenna element and the second sub-unit of the second antenna element is configured to receive a fourth signal having the second polarization characteristic and generated based on the fourth IF component of the second IF signal.

11. The antenna module of claim 10,
wherein at least one of the first sub-unit of the first antenna element or the first sub-unit of the second antenna element is configured to:

generate a radio frequency (RF) signal of a third frequency having the first polarization characteristic, based on the first signal, and generate a RF signal of a fourth frequency having the first polarization characteristic, based on the second signal, and wherein at least one of the second sub-unit of the first antenna element or the second sub-unit of the second antenna element is configured to:

generate a RF signal of the third frequency having the second polarization characteristic, based on the third signal, and generate a RF signal of the fourth frequency having the second polarization characteristic, based on the fourth signal.

12. The antenna module of claim 11, wherein the antenna module is configured to:

communicate with a P-cell using the RF signal of the third frequency having the first polarization characteristic, and communicate an S-cell using the RF signal of the fourth frequency having the first polarization characteristic.

13. The antenna module of claim 11, wherein the antenna module is configured to:

communicate with a P-cell using the RF signal of the third frequency having the second polarization characteristic, and communicate an S-cell using the RF signal of the fourth frequency having the first polarization characteristic.

14. The antenna module of claim 11, wherein the antenna module is configured to:

communicate with a P-cell using the RF signal of the third frequency having the first polarization characteristic and the RF signal of the third frequency having the second polarization characteristic, and communicate with an S-cell using the RF signal of the fourth frequency having the first polarization characteristic and the RF signal of the fourth frequency having the second polarization characteristic.

* * * * *